(12) United States Patent
Suzuki et al.

(10) Patent No.: US 7,568,751 B2
(45) Date of Patent: Aug. 4, 2009

(54) AUTOMATIC SUN VISOR DEVICE

(75) Inventors: Hidetoshi Suzuki, Hamamatsu (JP); Hiromi Suzuki, Kakegawa (JP)

(73) Assignee: ASMO Co., Ltd., Shizuoka-Ken (JP)

( * ) Notice: Subject to any disclaimer, the term of this patent is extended or adjusted under 35 U.S.C. 154(b) by 72 days.

(21) Appl. No.: 11/682,386

(22) Filed: Mar. 6, 2007

(65) Prior Publication Data

US 2007/0222252 A1 Sep. 27, 2007

(30) Foreign Application Priority Data

Mar. 7, 2006 (JP) ............................. 2006-061777
Jun. 16, 2006 (JP) ............................. 2006-167940

(51) Int. Cl.
*B60J 3/02* (2006.01)

(52) U.S. Cl. .................................................... 296/97.5

(58) Field of Classification Search ............... 296/97.1, 296/97.4, 97.5, 97.8, 97.9, 97.11
See application file for complete search history.

(56) References Cited

U.S. PATENT DOCUMENTS

| | | | | | |
|---|---|---|---|---|---|
| 4,832,468 | A | * | 5/1989 | Ito et al. | 359/275 |
| 5,390,045 | A | * | 2/1995 | Bernard, Jr. | 359/275 |
| 5,638,202 | A | * | 6/1997 | Rofe | 349/11 |
| 5,940,216 | A | * | 8/1999 | Gibbs | 359/601 |
| 6,072,549 | A | * | 6/2000 | Faris et al. | 349/16 |
| 6,580,472 | B1 | * | 6/2003 | Willingham et al. | 349/16 |
| 6,666,493 | B1 | * | 12/2003 | Naik | 296/97.4 |
| 6,811,201 | B2 | * | 11/2004 | Naik | 296/97.2 |
| 7,108,307 | B1 | * | 9/2006 | Sahara et al. | 296/97.4 |
| 7,328,931 | B2 | * | 2/2008 | Sahara et al. | 296/97.4 |
| 7,347,479 | B2 | * | 3/2008 | Suzuki et al. | 296/97.1 |
| 7,347,480 | B2 | * | 3/2008 | Lee | 296/97.4 |
| 2002/0033616 | A1 | * | 3/2002 | Schlecht et al. | 296/138 |
| 2003/0210355 | A1 | * | 11/2003 | Dao | 349/16 |
| 2005/0068629 | A1 | * | 3/2005 | Fernando et al. | 359/609 |
| 2005/0264022 | A1 | * | 12/2005 | Suzuki et al. | 296/97.4 |
| 2006/0175859 | A1 | * | 8/2006 | Isaac | 296/97.4 |
| 2009/0027759 | A1 | * | 1/2009 | Albahri | 359/277 |

FOREIGN PATENT DOCUMENTS

| | | |
|---|---|---|
| JP | 5-34013 | 5/1993 |
| JP | 07-329566 | 12/1995 |
| JP | 3103270 | 8/2000 |
| JP | 2002-211241 | 7/2002 |

* cited by examiner

*Primary Examiner*—H Gutman
(74) *Attorney, Agent, or Firm*—Patterson, Thuente, Skaar & Christensen, P.A.

(57) ABSTRACT

An incident intensity L is categorized into a low illuminance range A1 for immediately moving a sun visor body toward a retracted position, a high illuminance range A2 for immediately moving the sun visor body in a target direction set based on an incident angle, and an intermediate illuminance range A3 set between the two regions A1 and A2. When the incident intensity is in the region A3 and after the target position is continuously set closer to the retracted position or the projected position than the present position for a predetermined time, the sun visor body moves toward the target position. That is, there is a range between an illuminance threshold L1 for immediately moving the sun visor body toward the retracted position and an illuminance threshold L2 for immediately moving the sun visor body in the target direction based on the incident angle.

17 Claims, 20 Drawing Sheets

Fig.3
(A)
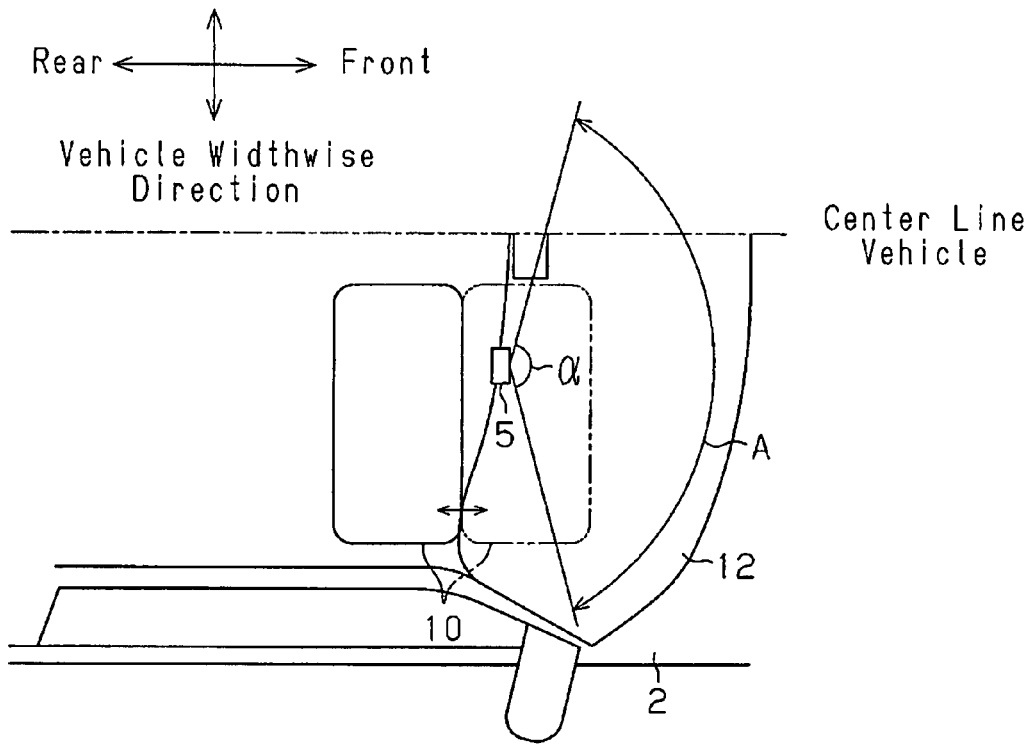
(B)
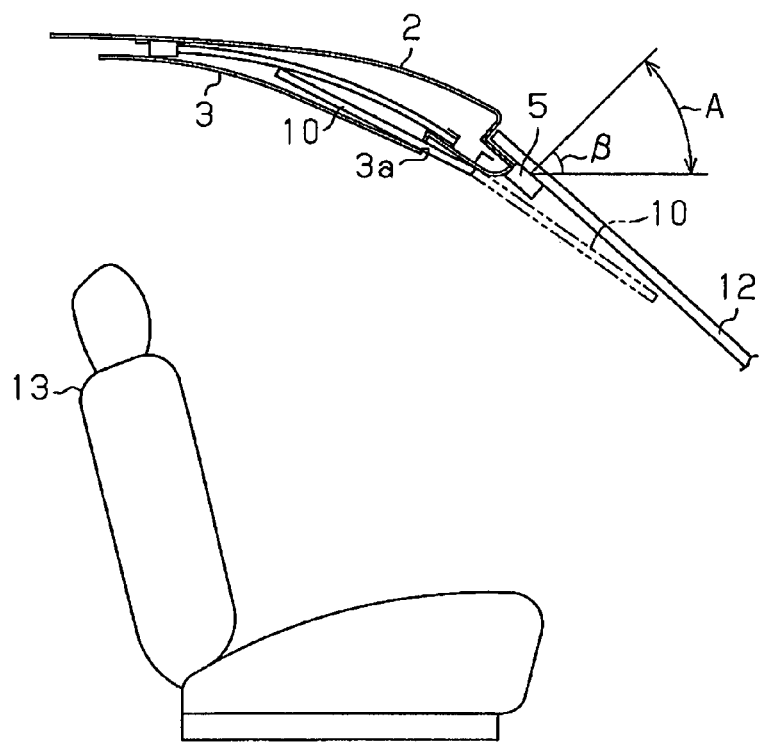

Fig.6

| Light Intensity (Illuminance Range) | Range of Illumination Intensity L [lux] | Movement in Projecting Direction | Movement in Retracting Direction |
|---|---|---|---|
| A2 — Sunny Location (High Illuminance Range) | >L2 (40000) | Immediately Move to Follow Incident Angle | Immediately Move to Follow Incident Angle |
| A3 — Shaded Location (Intermediate Illuminance Range) | >L1 (400) to L2 (40000) | Immediately Move to Follow Incident Angle | Start Moving When Target Position Is Continuously Set at Retracting Side for Predetermined Time |
| A1 — Nighttime or Indoors (Low Illuminance Range) | <L1 (400) | — | Immediately Retract |

Fig.7

| Intensity of Light (Illuminance Range) | Range of Illumination Intensity L [lux] | Movement in Projecting Direction | Movement in Retracting Direction |
|---|---|---|---|
| A2 — Sunny Location (High Illuminance Range) | >L2 (40000) | Immediately Move to Follow Incident Angle | Immediately Move to Follow Incident Angle |
| A3a — Shaded Location (Bright) (First Intermediate Illuminance Range) | L3 (4000) to L2 (40000) | Immediately Move to Follow Incident Angle | Start Moving When Target Position Is Continuously Set at Retracting Side for Predetermined Time |
| A3b — Shaded Location (Bright) (Second Intermediate Illuminance Range) | L1 (400) to L3 (4000) | Start Moving When Target Position Is Continuously Set at Retracting Side for Predetermined Time | Start Moving When Target Position is Continuously Set at Retracting Side for Predetermined Time |
| A1 — Nighttime or Indoors (Low Illuminance Range) | <L1 (400) | — | Immediately Retract |

Fig.16
(A)
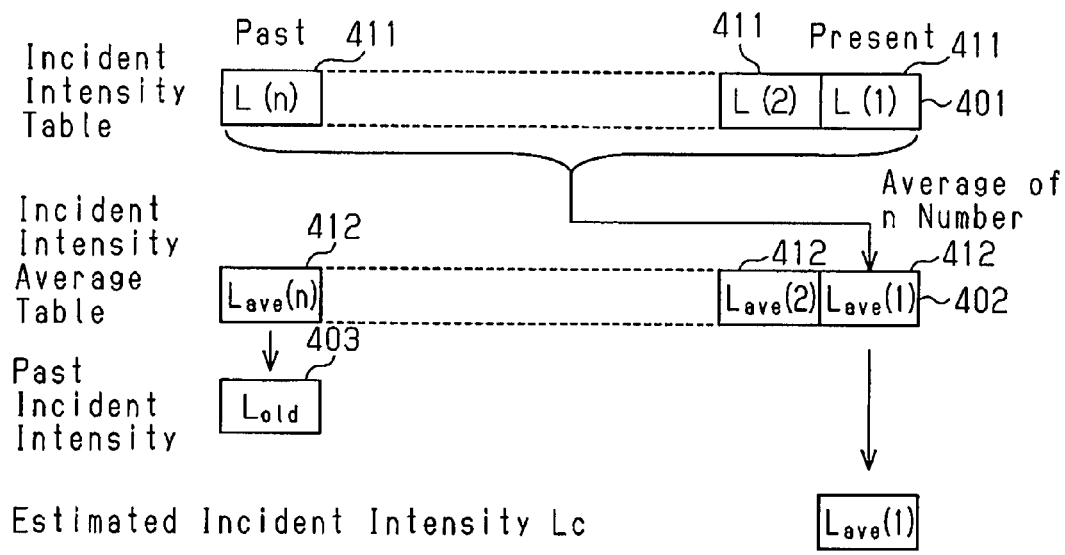
(B)
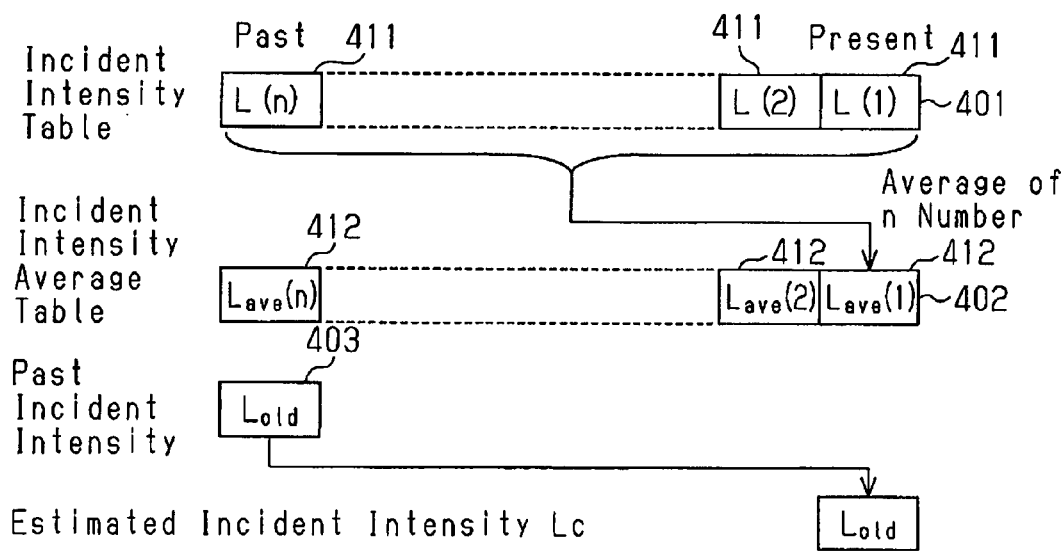

Fig.17
(A)
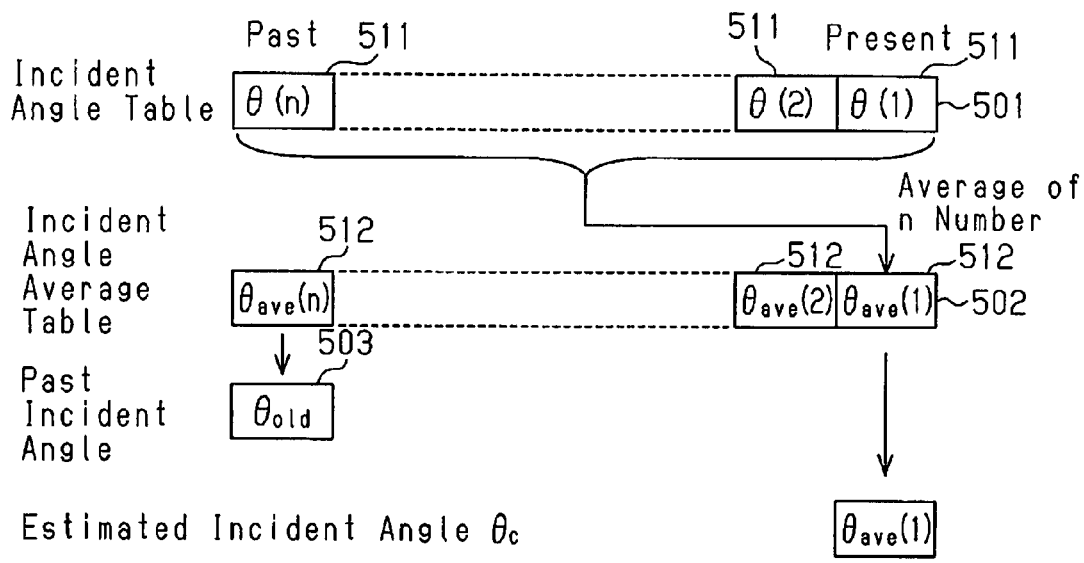
(B)
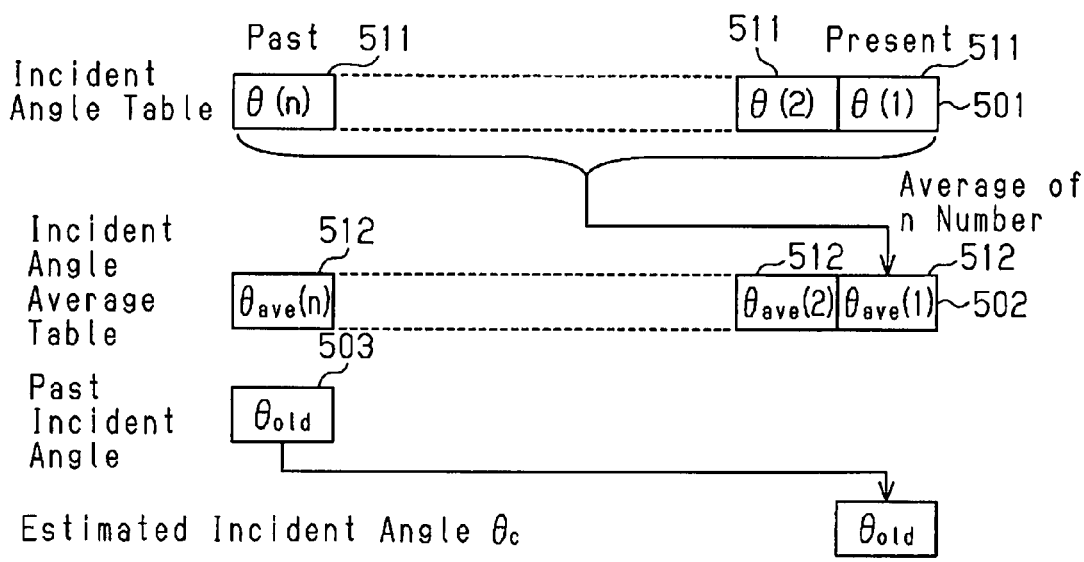

Fig.19
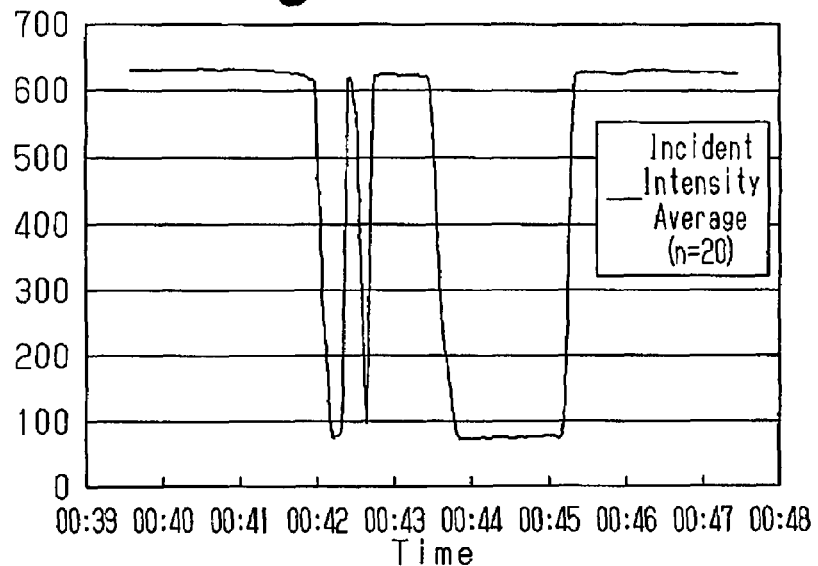
(A) Incident Intensity Average $L_{ave}$
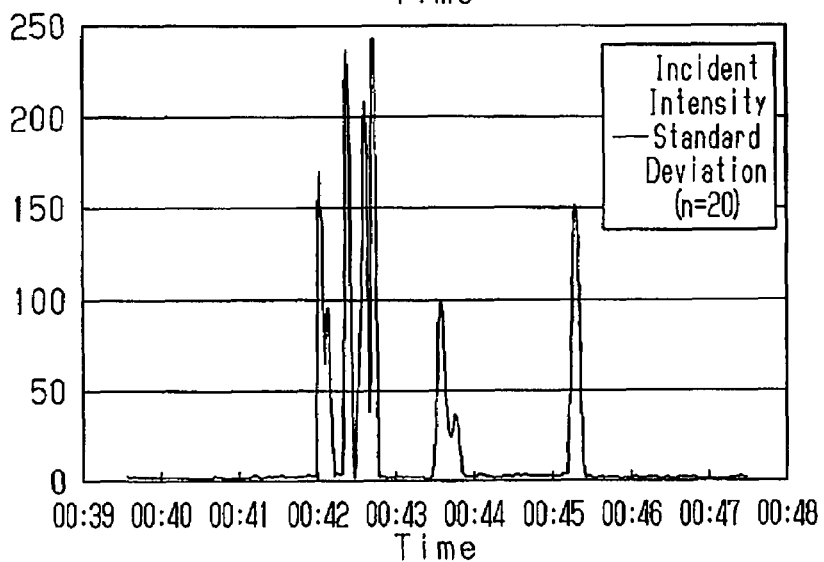
(B) Incident Intensity Standard Deviation $\sigma L$
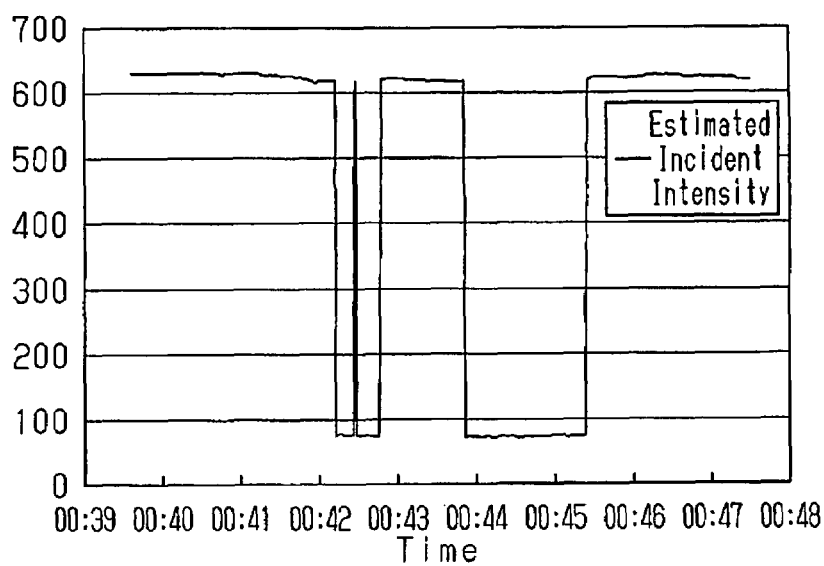
(C) Estimated Incident Intensity $L_c$

Fig.21
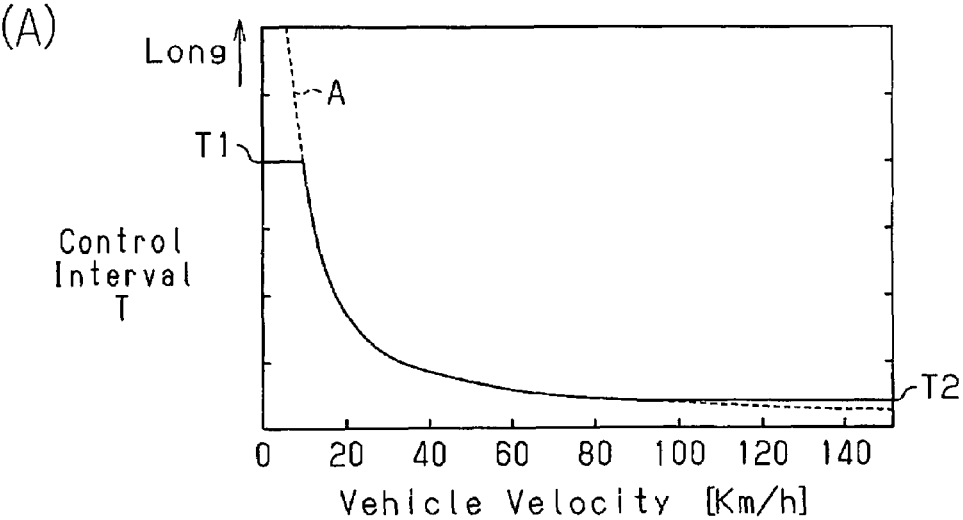
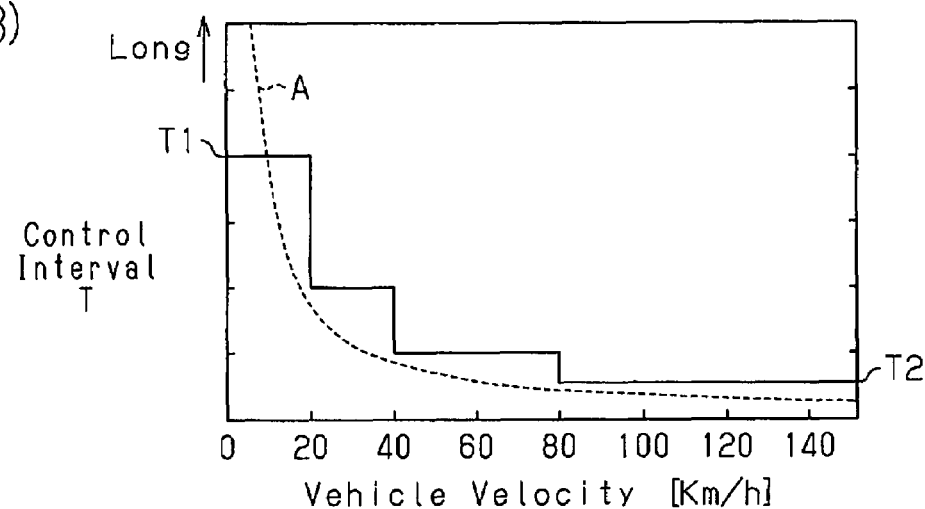
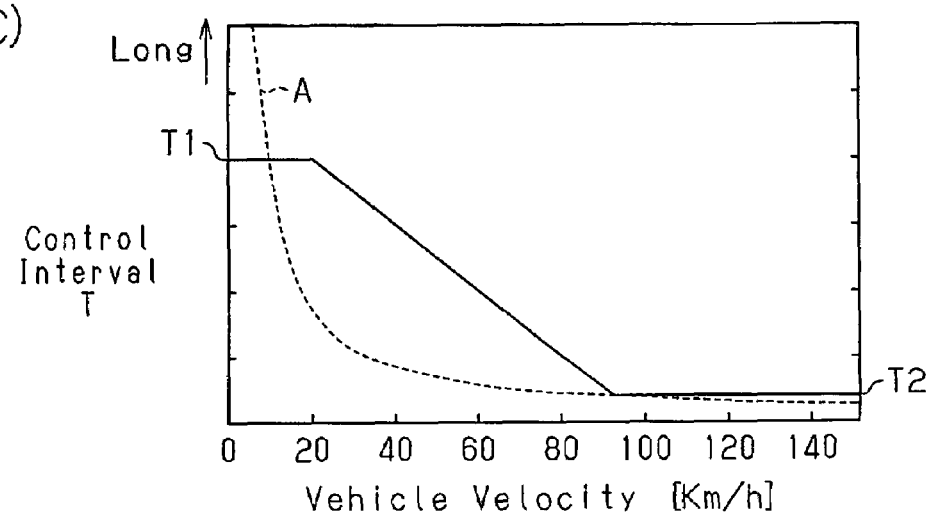

AUTOMATIC SUN VISOR DEVICE

BACKGROUND OF THE INVENTION

The present invention relates to an automatic sun visor device.

In the prior art, a sun visor device is arranged in a vehicle above the driver and front passenger seats to block light, such as sunlight, that enters the vehicle occupant compartment of the vehicle. The sun visor device prevents the incident light that enters the vehicle from reaching the position of the eyes of a vehicle occupant so that the vehicle occupant is not dazzled by the light. However, the intensity of the incident light and its incident angle constantly vary depending on the direction of the vehicle or the surrounding environment of the vehicle. Thus, the vehicle occupant is constantly required to adjust the sun visor device in accordance with such changes in the incident light. To simplify such adjustments, an automatic sun visor device has been proposed. The automatic sun visor device automatically adjusts the position and the light transmission state of a light shielding plate based on the illuminance or angle of the incident light.

Japanese Laid-Open Patent Publication No. 7-329566 describes a sun visor device including a first photosensor for detecting incident light, a second photosensor for detecting incident light at an angle differing from the angle of the incident light detected by the first photosensor, and a control circuit for detecting the incident angle of incident light based on a detection signal output from each photosensor. The sun visor device adjusts the position of a sun visor body so that the sun visor body blocks incident light so as to follow changes in the incident angle of the incident light when the illuminance of the incident light detected by each photosensor exceeds a predetermined value. The sun visor body moves to a retracted position when the illuminance of the incident light detected by each photosensor is less than the predetermined value.

Japanese Laid-Open Utility Model Publication No. 5-34013 describes a sun visor device including a liquid crystal panel, which functions as a belt-shaped sun visor body, arranged on an upper portion of a front glass for an automobile. The sun visor device includes a sunlight sensor arranged on a headrest of a passenger seat. The sun visor device controls the light transmission state of the liquid crystal panel based on the amount of direct sunlight sensed by the sunlight sensor.

Japanese Patent No. 3103270 describes a sun visor device including a light shielding plate, which functions as a sun visor body, arranged above, for example, a driver seat in a vehicle. The sun visor device includes a first photosensor arranged at a projection side of the light shielding plate and a second photosensor arranged at a retraction side of the light shielding plate. The sun visor device further includes a control circuit for controlling the position of the light shielding plate based on detection signals output from the first and second photosensors. The sun visor device automatically controls and positions the light shielding plate between the first and second photosensors.

Japanese Laid-Open Patent Publication No. 2002-211241 describes an automatic sun visor device including a plurality of visor regions, which functions as a sun visor body, formed on a vehicle window using liquid crystal. The automatic sun visor device further includes orientation sensors for detecting the intensity of incident light in predetermined directions and a reference illuminance sensor for detecting brightness at and around the window. The sun visor device uses a comparator to determine whether the incident light needs to be blocked in each visor region based on the intensity of the incident light detected by the corresponding orientation sensor. Further, when the value of a reference illuminance signal output from the reference illuminance sensor is high, the reference level used by the comparator to determine whether incident light needs to be blocked is automatically set to a high value. In this manner, the sun visor device refers to the brightness of the surroundings when determining whether to block light.

However, the device described in Japanese Laid-Open Patent Publication No. 7-329566 detects the incident angle when detecting incident light having an illuminance greater than or equal to a predetermined value. In comparison to when the incident light is direct sunlight having a high illuminance, the device does not as accurately detect the incident angle of incident light having illuminance that is in an intermediate illuminance range, such as light in a shaded location. Thus, when the sun visor body is adjusted to follow the incident angle of incident light in the intermediate illuminance range, the sun visor body may move frequently and annoy the vehicle occupant.

To prevent the sun visor body from following incident light having an intermediate illuminance, a threshold L0, used to determine an illuminance range in which the sun visor body is moved so as to follow an incident angle θ of incident light and an illuminance range for retracting the sun visor body, may be set at a relatively high value as shown in FIG. 8(B). However, when the illuminance of the incident light fluctuates around the threshold, such as when the incident light is sunlight passing through the leaves of trees, the sun visor body may move frequently in the retraction direction and thus annoy the vehicle occupant.

To prevent frequent movement of the sun visor body, the operation of the sun visor body may be delayed, and the sun visor body may be stopped for a certain period of time. However, the device would not be able to instantaneously widen the view of the vehicle occupant when, for example, the vehicle enters a dark location like a tunnel and the blocking of light becomes unnecessary.

In the case of the device described in Japanese Laid-Open Utility Model Publication 5-34013, the liquid crystal panel is set in a light blocking state when the output of the sunlight sensor exceeds a threshold and set in a light transmitting state when the output of the sunlight sensor remains less than the threshold for a predetermined period of time. However, even if the liquid crystal panel does not need to be set in the light blocking state, the liquid crystal panel is once set in the light blocking state even of the output of the sunlight sensor only temporarily exceeds the threshold. In this case, the liquid crystal panel does not return to the light transmitting state until the predetermined period elapses. This may annoy the vehicle occupant.

In the case of the device described in Japanese Patent No. 3103270, the output of the first and second photosensors frequently changes when the light receiving state of the photosensors frequently changes due to, trees or buildings. This frequently moves the light shielding plate and annoys the vehicle occupant.

In the same manner, in the case of the device described in Japanese Laid-Open Patent Publication No. 2002-211241, the determination of the comparator for blocking light also changes frequently when the output of each sensor changes frequently. Thus, when the light receiving state of each sensor changes frequently due to, for example, trees or buildings, the output of each sensor also changes frequently. As a result, the visor regions move frequently and annoy the vehicle occupant.

SUMMARY OF THE INVENTION

It is an object of the present invention to provide an automatic sun visor device that accurately blocks incident light that may dazzle a vehicle occupant without annoying the vehicle occupant.

A first aspect of the present invention provides an automatic sun visor device including a sun visor body for blocking incident light entering a passenger compartment from the exterior and a driving means for moving the sun visor body. The sun visor body is movable between a retracted position at which the sun visor body is retracted into the passenger compartment and a projected position at which the sun visor body is most projected from the retracted position. The automatic sun visor device includes an incident light detecting means for detecting incident intensity and incident angle of the incident light. A position detecting means detects the present position of the sun visor body. A controller controls movement of the sun visor body with the driving means. The controller moves the sun visor body toward a target position that is set based on the incident angle when the incident intensity is in a high illuminance range that is above a predetermined value. The controller moves the sun visor body toward the retracted position when the incident intensity is in a low illuminance range that is below the predetermined value. The controller sets an intermediate illuminance range between a first threshold for determining whether or not the incident intensity is in the low illuminance range and a second threshold for determining whether or not the incident intensity is in the high illuminance range. The controller moves the sun visor body toward the target position after the target position is continuously set closer to the retracted position or the projected position than the present position for a predetermined time when the incident intensity is in the intermediate illuminance range.

BRIEF DESCRIPTION OF THE DRAWINGS

FIG. 3(A) shows a measurement range in a horizontal direction;

FIG. 3(B) shows a measurement range in a heightwise direction;

FIG. 6 is a chart showing operating conditions of a sun visor body;

FIG. 7 is a chart showing operating conditions for another example of a sun visor body;

FIG. 16(A) is a diagram showing the processing of data related with the incident intensity;

FIG. 16(B) is a diagram showing the processing of data related with the incident intensity;

FIG. 17(A) is a diagram showing the processing of data related with the incident intensity;

FIG. 17(B) is a diagram showing the processing of data related with the incident intensity;

FIG. 19(A) is a diagram showing the effects of the incident intensity data processing;

FIG. 19(B) is a diagram showing the effects of the incident intensity data processing;

FIG. 19(C) is a diagram showing the effects of the incident intensity data processing;

FIG. 21(A) is a graph showing the relationship between the sun visor position control and the vehicle velocity;

FIG. 21(B) is a graph showing the relationship between the sun visor position control and the vehicle velocity; and FIG. 21(C) is a graph showing the relationship between the sun visor position control and the vehicle velocity.

DETAILED DESCRIPTION OF THE PREFERRED EMBODIMENTS

First Embodiment

A vehicle sun visor device (hereafter referred to as a sun visor device) according to a first embodiment of the present invention will now be described with reference to the drawings.

Figure 1:
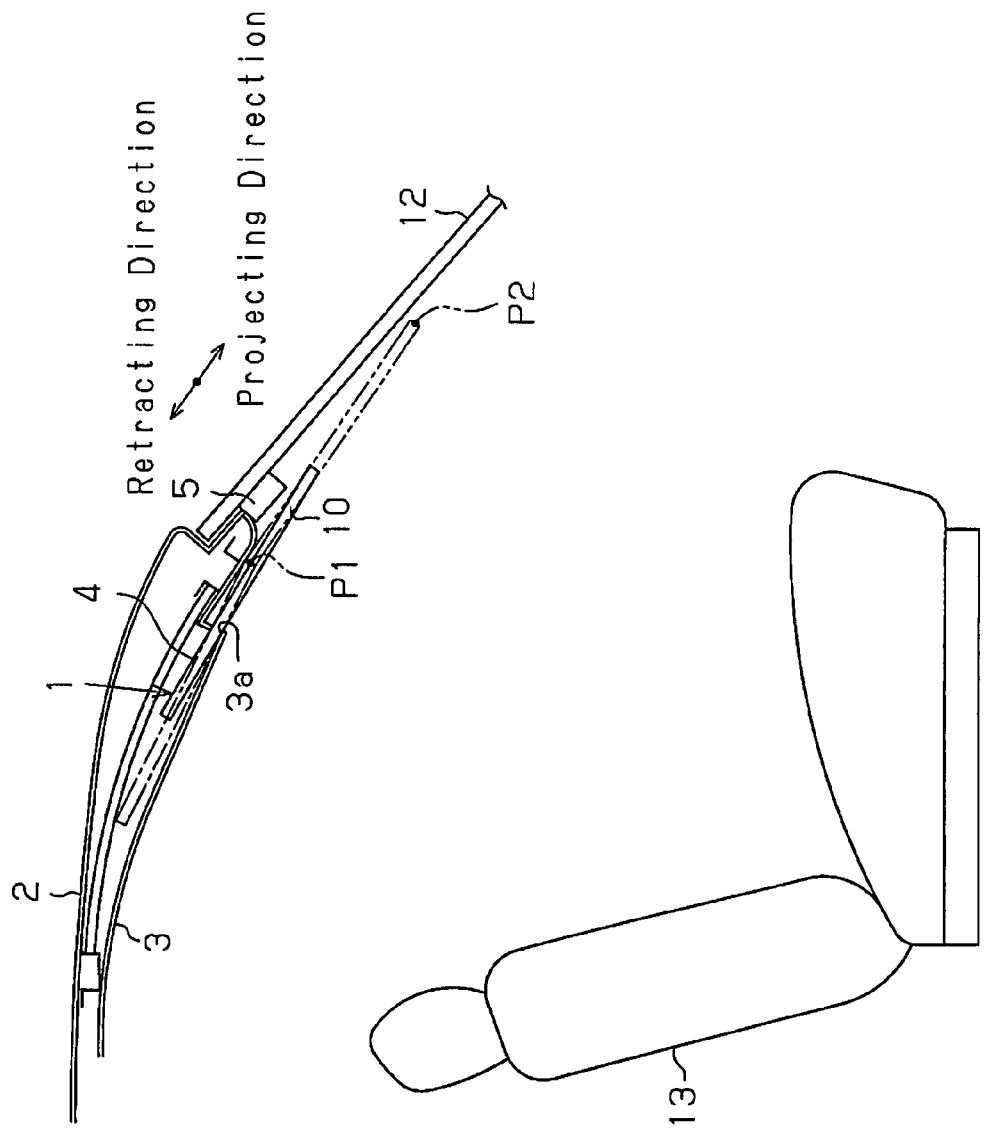
FIG. 1 is a schematic diagram of a vehicle sun visor device according to a first embodiment of the present invention.
Figure 2:
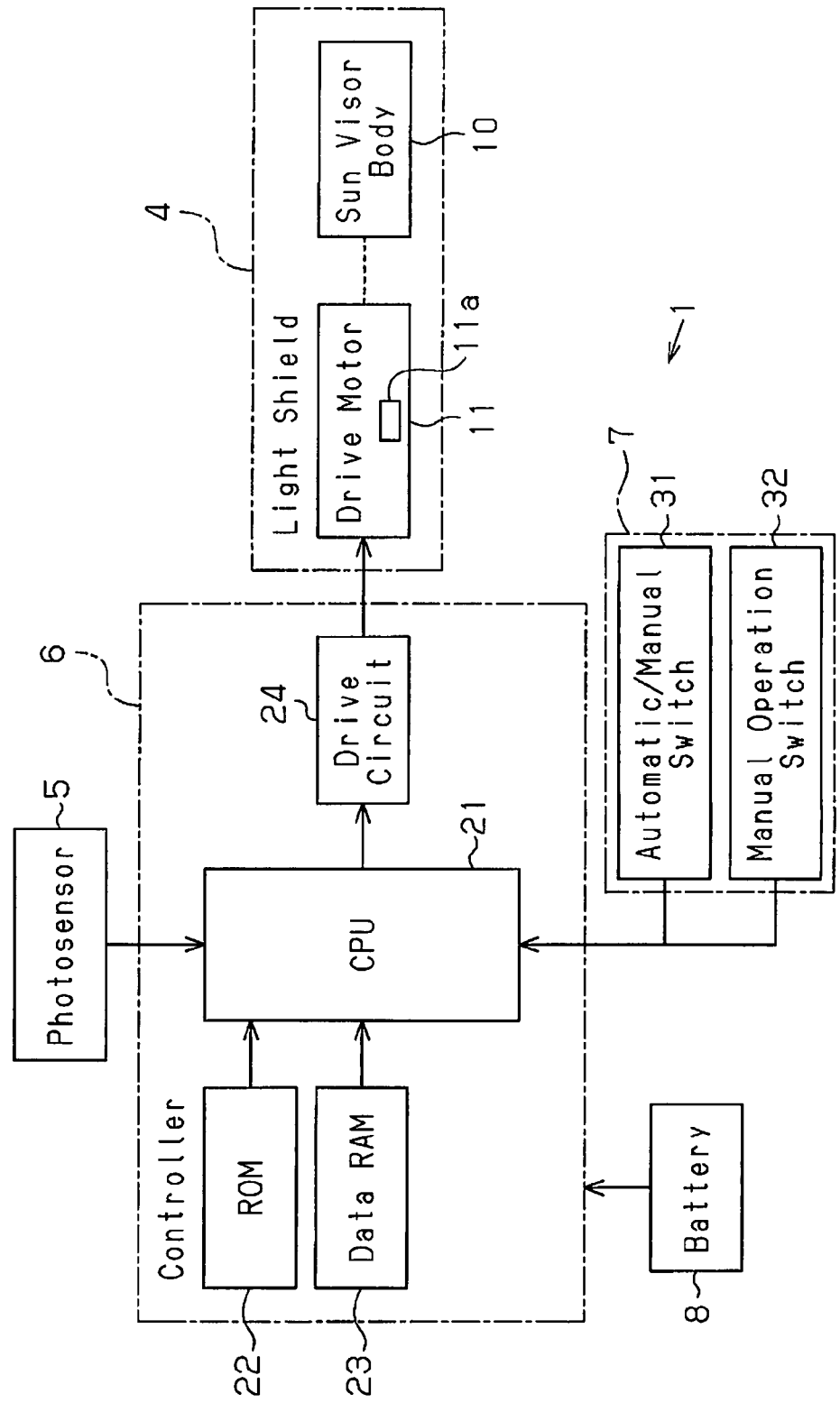
FIG. 2 is a block diagram showing the structure of the sun visor device.

As shown in FIGS. 1 and 2, the sun visor device 1 is arranged in a ceiling 3 of a vehicle 2. The sun visor device 1 includes a light shield 4, a photosensor 5 functioning as an incident light detection means, a controller 6, and an operation unit 7. The sun visor device 1 prevents a vehicle occupant (driver) from being dazzled by direct sunlight that reaches an actual eye position O of a vehicle occupant in the passenger compartment. More specifically, referring to FIG. 4, the sun visor device 1 assumes that an eye position P is located at a position distanced downward by a predetermined distance from the actual eye position O of the vehicle occupant and executes a control so that incident light does not reach the eye position P. The predetermined distance is set in a manner that the sun visor device 1 blocks a sufficient amount of light to prevent the vehicle occupant from being dazzled by direct sunlight.

The light shield 4 is accommodated and fixed in the ceiling 3. The light shield 4 includes a sun visor body 10, a drive mechanism (not shown), and a drive motor 11 functioning as a driving means. The sun visor body 10 is rectangular and is formed from an opaque material to block incident light. An opening 3a is formed at a front end of the ceiling 3. The sun visor body 10 is movable between a retracted position P1 at which a distal portion of the sun visor body 10 is retracted into the ceiling 3 and an projected position P2 at which the sun visor body 10 is projected most frontward from the ceiling 3. When the drive motor 11 is driven, the sun visor body 10 moves toward the retracted position P1 (in a retracting direction) or the projected position P2 (in a projecting direction) based on the direction of the rotation produced by the drive motor 11. When most projected (when the distal end of the sun visor body 10 is located at the projected position P2), the sun visor body 10 covers a predetermined range extending from a middle portion to a top portion of a front glass 12 at the side of the driver seat.

The drive motor 11 includes a rotation detector 11a functioning as a position detection means. The rotation detector 11a generates a pulse signal in synchronization with the rotation of the drive motor 11 and outputs the pulse signal to the controller 6. The rotation detector 11a includes, for example, two Hall devices, each of which outputs a pulse signal in synchronization with the rotation of the drive motor 11 in a manner that the pulse signals output by the two Hall devices have a predetermined phase difference. The controller 6 detects the rotation direction of the drive motor 11 based on the phase difference between the pulse signals. The controller 6 counts the number of pulses with the edges of each pulse signal and detects the present position θold of the sun visor body 10 based on the count value.

Figure 4:
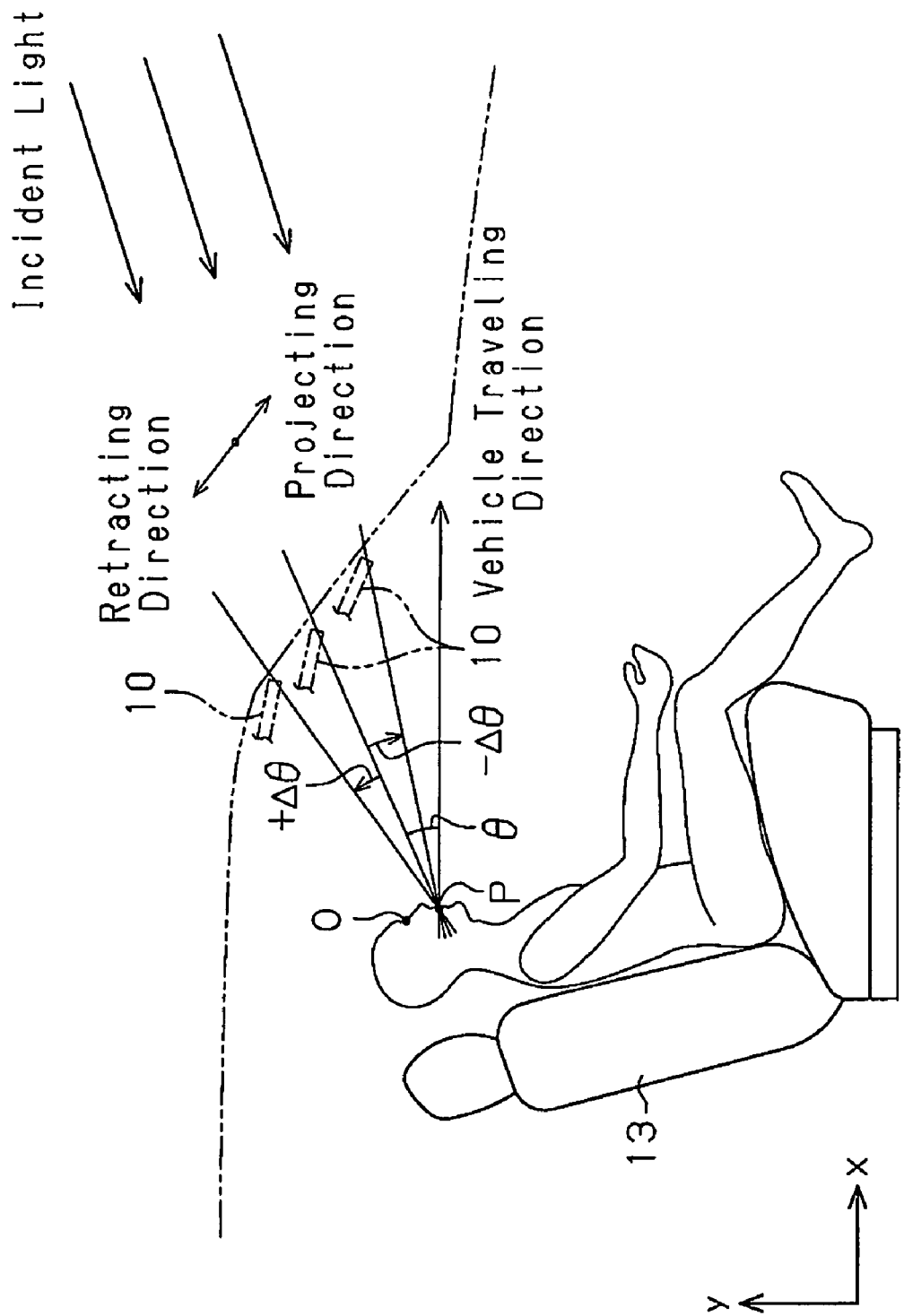
FIG. 4 is a diagram showing a target direction of a sun visor body.

The photosensor 5 includes a plurality of light-receiving elements (not shown). As shown in FIGS. 3(A) and 3(B), the photosensor 5 is arranged on an upper end portion of the front glass 12 in the passenger compartment. The photosensor 5 is arranged substantially in front of a seat 13 on which a vehicle occupant is seated. The photosensor 5 detects the incident intensity L, incident angle θ in the heightwise direction, and incident angle in the horizontal direction of the incident light that enters a measurement range A (range of angle α in the horizontal direction as shown in FIG. 3(A) and range of angle β in the heightwise direction as shown in FIG. 3(B)). The measurement range A is the minimum range in which light must be blocked by the sun visor body 10 when a vehicle occupant with an average build is properly seated on the seat 13. As shown in FIG. 4, the incident angle θ in the heightwise direction is the angle defined by the horizontal direction (traveling direction of the vehicle 2) and the traveling direction of the incident light. When incident light enters the measurement range A, the photosensor 5 provides the controller 6 with an incident light detection signal in accordance with the incident intensity L of the incident light, the incident angle θ in the heightwise direction, and the incident angle in the horizontal direction.

As shown in FIG. 2, the controller 6 includes a CPU 21, a ROM 22, a RAM 23, and a drive circuit 24. The controller 6 is supplied with drive current from a battery 8. The CPU 21 controls the sun visor device 1. The CPU 21 detects the incident angle θ in the heightwise direction and the incident angle α in the horizontal direction through calculations based on the incident light detection signal from the photosensor 5. The CPU 21 detects an incident intensity (illuminance) L of the incident light that enters the measurement range A based on the incident light detection signal from the photosensor 5. The CPU 21 detects the present position θold of the sun visor body 10 based on a pulse signal output from the rotation detector 11a.

The ROM 22 stores a first threshold L1 and a second threshold L2. The second threshold L2 is an incident intensity value that is greater than the first threshold L1. The incident intensity L of the incident light is categorized into a low illuminance range A1, which is the range below the first threshold L1 in which retraction control is executed, a high illuminance range A2, which is the range above the second threshold L2 in which light blocking control is executed, and an intermediate illuminance range A3, which is the range between the regions A1 and A2 in which intermediate illuminance light blocking control is executed. The CPU 21 outputs a control signal for immediately arranging the sun visor body 10 at the retracted position P1 when detecting incident light having an incident intensity in the low illuminance range A1 (retracting processing S200 shown in FIG. 5). When detecting incident light having an incident intensity in the high illuminance range A2, the CPU 21 outputs a control signal for moving the sun visor body 10 to a target position that is set based on the incident angle θ of the incident light (high illumination light blocking processing S300 shown in FIG. 5). When detecting incident light having an incident intensity in the intermediate illuminance range A3, the CPU 21 determines the continuity of changes in the incident light, and outputs a control signal for moving the sun visor body 10 based on the determination result (intermediate illumination light blocking processing S400 shown in FIG. 5).

The RAM 23 has a plurality of data boxes. The incident angle θ and the incident intensity L of the detected incident light are stored in the RAM 23 (each data box). The CPU 21 determines the target position of the sun visor body 10 based on the incident angle θ and the incident intensity L of the incident light. When the incident intensity L of the incident light is in the low illuminance range A1, the CPU 21 sets the retracted position P1 as the target position. When the incident intensity L of the incident light is in the intermediate illuminance range A3 or the high illuminance range A2, the CPU 21 calculates the target position of the sun visor body 10 for blocking light based on the incident angle θ of the detected incident light.

The RAM 23 further stores the present position of the sun visor body 10 in association with an angle (present position θold). The CPU 21 compares the present position θold of the sun visor body 10 with the incident angle θ of the detected incident light. The CPU 21 determines the direction of the target position (target direction) with respect to the present position θold before moving the sun visor body 10 to the target position to block light (target direction determination processing S401 shown in FIG. 5). In detail, when the incident angle θ is greater than the present position θold (+Δθ) and the target position of the sun visor body 10 for blocking light is closer to the retracted position P1 than the present position θold as shown in FIG. 4, the CPU 21 determines that the target direction is the retracting direction. When the incident angle θ is smaller than the present position θold (−Δθ) and the target position of the sun visor body 10 for blocking light is closer to the projected position P2 than the present position θold, the CPU 21 determines that the target direction is the projecting direction.

The RAM 23 further stores data (timer count) for detecting the continuity of the target direction. When the incident intensity L of the incident light is in the low illuminance range A1 or in the high illuminance range A2, the CPU 21 clears the timer count. When the incident intensity L of the incident light is in the intermediate illuminance range A3 and the target direction is the projecting direction, the CPU 21 clears the timer count. When the incident intensity L of the incident light is in the intermediate illuminance range A3 and the target direction is the retracting direction, the CPU 21 increments the timer count. When the timer count exceeds a predetermined value, the CPU 21 determines that the retracted direction has been continuously set as the target direction of the sun visor body 10 for a predetermined time T.

When the present position θold of the sun visor body 10, the incident angle θ, and the incident intensity L are newly stored into each data box, the old data stored in each data box is deleted.

The drive circuit 24 supplies drive current to the drive motor 11 based on a control signal from the CPU 21. The drive motor 11 produces rotation in a forward direction or in a reverse direction in accordance with the drive current to project or retract the sun visor body 10.

The operation unit 7 includes an automatic/manual switch 31 and a manual operation switch 32. The sun visor device 1 is switchable between a manual mode in which the vehicle occupant manually adjusts the position of the sun visor body 10 and an automatic mode in which the controller 6 adjusts the position of the sun visor body 10. The automatic/manual switch 31 is used to select the mode for adjusting the position of the sun visor body 10.

The manual operation switch 32 is used by the vehicle occupant to project or retract the sun visor body 10 or adjust the amount the sun visor body 10 is projected. When the manual operation switch 32 is operated, the position of the sun visor body 10 is adjusted in the manual mode.

Figure 5:
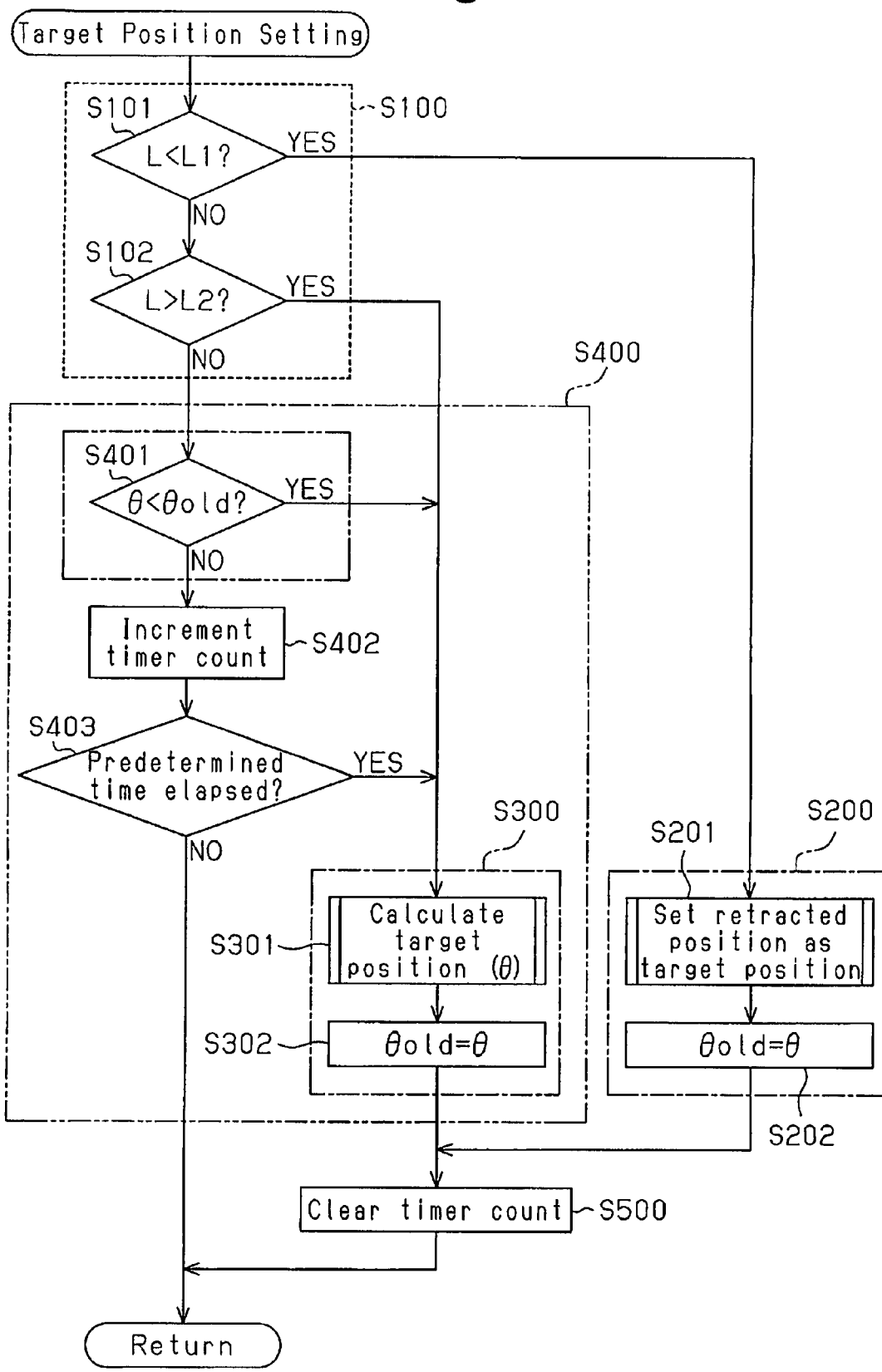
FIG. 5 is a flowchart showing a target position setting process.

A target position setting process for setting the target position of the sun visor body 10 based on the incident angle θ and the incident intensity L of the incident light will now be described with reference to FIG. 5. The target position setting process shown by the flowchart in FIG. 5 is repeatedly performed in predetermined cycles. In the present embodiment, the first threshold L1 is set, for example, at 400 lx (lux). The low illuminance range A1 is the range of incident light that enters the vehicle when located outdoor in the nighttime, within a tunnel, or indoor. That is, the low illuminance range A1 is the range below the first threshold L1 that does not require light blocking. The second threshold L2 is set at, for example, at 4000 lx. The high illuminance range A2 is the range of incident light (direct sunlight) that enters the vehicle located outdoor on a sunny day. That is, the high illuminance range is the range above the second threshold L2 that requires accurate light blocking. The intermediate illuminance range A3 is the range of incident light that enters the vehicle located outdoor on a cloudy day or the incident light passing through the leaves of trees. That is, the intermediate illuminance range is the range below the high illuminance range A2 in which it is relatively difficult to determine the incident angle θ.

As shown in FIG. 5, when detecting incident light, the controller 6 first performs illuminance range determination processing S100. In step S100, the controller 6 determines whether the incident intensity L of the incident light is in the high illuminance range A2, the intermediate illuminance range A3, or the low illuminance range A1. Based on the determination result, the controller 6 performs retracting processing S200 for retracting the sun visor body 10, performs high illuminance light blocking processing S300 for moving the sun visor body 10 in accordance with the incident angle θ, or determines the continuity of the change in the incident light and performs intermediate illuminance light blocking processing S400 for moving the sun visor body 10 based on the determination result.

When detecting the incident intensity L and the incident angle θ of the incident light based on a detection signal of the photosensor 5, the CPU 21 first compares the incident intensity L of the incident light with the first threshold L1 in step S101. When the incident intensity L of the incident light is less than the first threshold L1 (L<L1), the CPU 21 determines that the incident intensity L of the incident light is in the low illuminance range A1, and proceeds to step S201 in which the retracting processing S200 is performed.

In step S201, the CPU 21 sets the retracted position P1 as the target position and outputs a control signal for moving the sun visor body 10 to the retracted position P1. The CPU 21 then updates the present position θold of the sun visor body 10 in step S202. Next, in step S500, the CPU 21 initializes the timer count stored in the RAM 23 and temporarily terminates the target position setting process. Then, the CPU 21 performs the illuminance range determination processing S100 again to determine the illuminance range of the incident light detected next. As described above, when the illuminance of the incident light is in the low illuminance range A1, the sun visor body 10 is immediately retracted without determining the target direction (refer to FIG. 6).

When the incident intensity L of the incident light is greater than or equal to the first threshold L1 in step S101, the CPU 21 proceeds to step S102, and compares the incident intensity L of the incident light with the second threshold L2. When the incident intensity L of the incident light is greater than the second threshold L2, the CPU 21 determines that the incident intensity L of the incident light is in the high illuminance range A2 and proceeds to step S301 to perform the high illuminance light blocking processing S300.

The CPU 21 calculates the target position based on the incident angle θ in step S301 and outputs a control signal for moving the sun visor body 10 to the target position. The CPU 21 then updates the present position θold of the sun visor body 10 in step S302. Next, in step S500, the CPU 21 initializes the timer count stored in the RAM 23 and temporarily terminates the target position setting process. The CPU 21 then performs the illuminance range determination processing S100 again to determine the illuminance range of the incident light detected next. As described above, when the illuminance of the incident light is in the high illuminance range A2, the sun visor body 10 moves to follow the change in the incident angle θ without determining the target direction (refer to FIG. 6).

When the incident intensity L of the incident light is less than the second threshold L2 in step S102, the CPU 21 determines that the incident intensity L of the incident light is in the intermediate illuminance range A3 and proceeds to step S401 to perform the intermediate illuminance light blocking processing S400.

First, in step S401, the CPU 21 performs the target direction determination processing to determine the target direction. When the target direction is the projecting direction (θ<θold, or −Δθ direction shown in FIG. 4), the CPU 21 proceeds to step S301. The CPU 21 calculates the target position based on the incident angle θ in step S301 and outputs a control signal for moving the sun visor body 10 to the target position. Next, the CPU 21 updates the present position θold of the sun visor body 10 in step S302. Then, in step S500, the CPU 21 initializes the timer count stored in the RAM 23 and temporarily terminates the target position setting process. Subsequently, the CPU 21 performs the illuminance range determination processing S100 again to determine the illuminance range of the incident light detected next. As described above, when the illuminance of the incident light is in the intermediate illuminance range A3 and the target direction is the projecting direction, the sun visor body 10 moves in the projecting direction to follow the change in the incident angle θ of the incident light.

When the retracting direction is the target direction in step S401 (+Δθ direction shown in FIG. 4), the CPU 21 proceeds to step S402. In step S402, the CPU 21 increments the timer count stored in the RAM 23 and then proceeds to step S403.

In step S403, the CPU 21 determines whether the retracting direction has been continuously set as the target direction for the predetermined time T. When the target direction has not been continuously set for the predetermined time, the CPU 21 temporarily terminates the target position setting process and performs the illuminance range determination processing S100 again to determine the illuminance range of the incident light detected next. As described above, when the illuminance of the incident light is in the intermediate illuminance range A3, the sun visor body 10 is tentatively held at the present position if the detected incident light sets the target position closer to the retracted position P1 than the present position θold.

When the target position has been continuously set for the predetermined time T, the CPU 21 proceeds to step S301. The CPU 21 calculates the target position based on the incident angle θ in step S301 and outputs a control signal for moving the sun visor body 10 to the target position. Next, the CPU 21 updates the present position θold of the sun visor body 10 in step S302. The CPU 21 then initializes the timer count stored in the RAM 23 in step S500 and temporarily terminates the target position setting process. The CPU 21 then performs the illuminance range determination processing S100 again to determine the illuminance range of the incident light detected next.

As described above, when the illuminance of the incident light is in the intermediate illuminance range A3 and the target direction is the retracting direction, the sun visor body 10 starts moving in the retracting direction and is arranged at the target position calculated based on the incident angle θ of the incident light after the incident light that sets the target position closer to the retracted position P1 than the present position θold has been continuously detected for the predetermined time T, that is, after the sun visor body 10 has been continuously held at the present position for the predetermined time T. In other words, when the illuminance of the incident light is in the intermediate illuminance range A3, the sun visor body 10 does not move in the retracting direction until incident light that sets the target position closer to the retracted position P1 than the present position θold, or incident light that moves the sun visor body 10 in the retracting direction, has been continuously detected for the predetermined time T.

The operation of the sun visor device 1 of the first embodiment will now be described in comparison with the conventional sun visor device.

Figure 8:
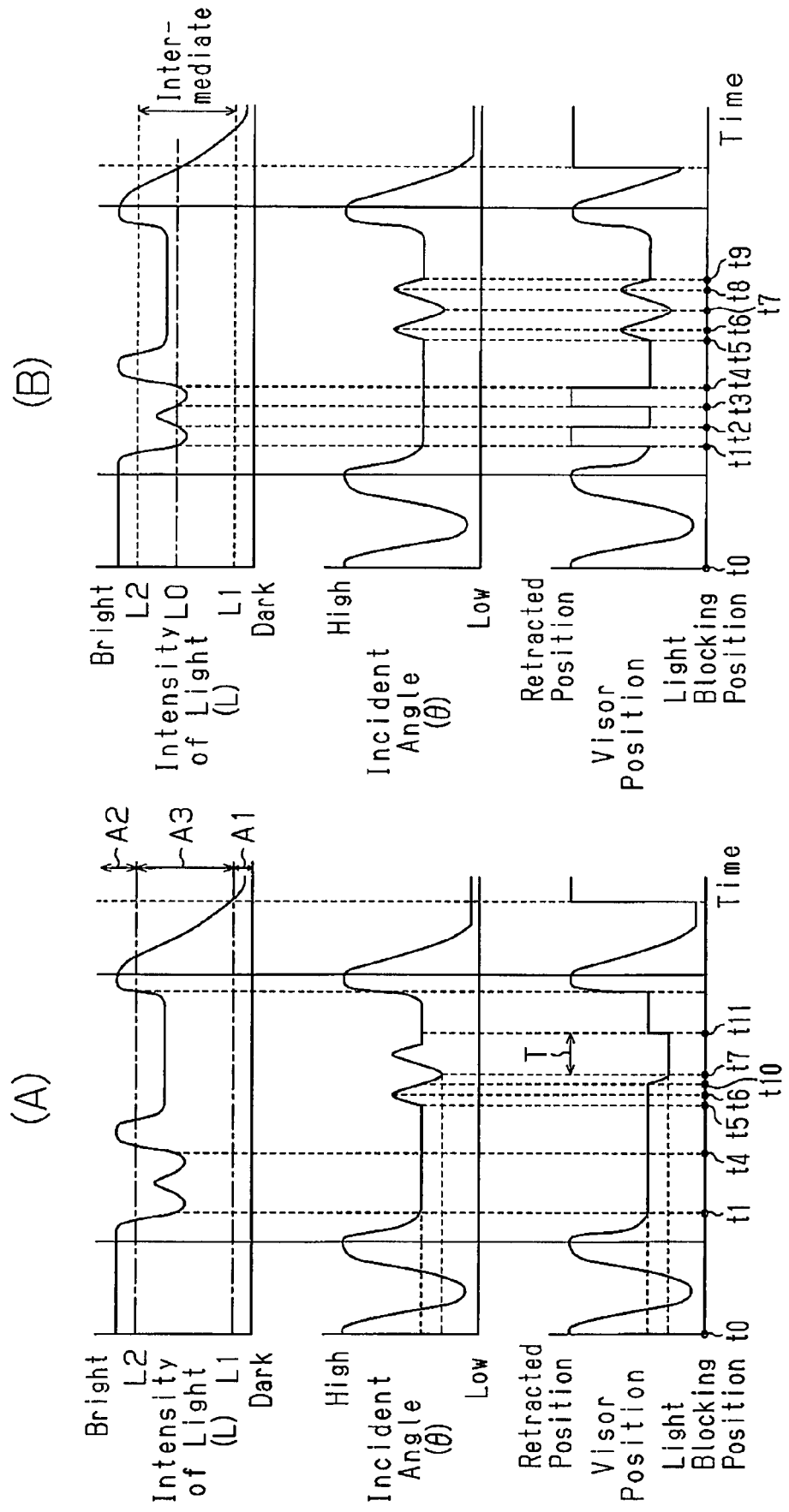
FIG. 8(A) is a diagram showing the effects of the sun visor device.
FIG. 8(B) is a diagram showing the effects of the sun visor device.

FIG. 8(A) shows the operation of the sun visor device 1 of the first embodiment, whereas FIG. 8(B) shows the operation of the conventional sun visor device. The conventional sun visor device has control conditions set for each of the two illuminance ranges defined by the single threshold L0. The sun visor device 1 of the present embodiment has control conditions set for each of the three illuminance ranges (the low illuminance range A1, the intermediate illuminance range A3, and the high illuminance range A2) defined by the two thresholds L1 and L2.

As shown in FIG. 8(B), the sun visor body 10 of the conventional sun visor device moves to follow a change in the incident angle θ of incident light when incident light having an illuminance greater than the threshold L0 is detected at timing t0. When incident light having an illuminance less than the threshold L0 is detected at timing t1, the sun visor body 10 is immediately moved toward the retracted position P1 and held at the retracted position P1. When incident light having an illuminance greater than the threshold L0 is detected at timing t2, the sun visor body 10 is moved toward a target position that is calculated to follow the change in the incident angle θ of the incident light. When incident light having an illuminance less than the threshold L0 is detected at timing t3, the sun visor body 10 is immediately moved toward the retracted position P1 and held at the retracted position P1. When incident light having an illuminance greater than the threshold L0 is detected at timing t4, the sun visor body 10 moves toward a target position that is calculated to follow the change in the incident angle θ of the incident light. Between timings t1 and t4, the incident intensity L fluctuates around the threshold L0 that is used to determine the illuminance range for retracting the sun visor body 10 and the illuminance range for moving the sun visor body 10 to the target position set based on the incident angle θ. During this period, the sun visor body 10 frequently moves between the retracted position P1 and the target position.

As shown in FIG. 8(A), the sun visor device 1 of the first embodiment differs from the conventional device in that it sets the illuminance range (intermediate illuminance range A3) for executing the intermediate illuminance light blocking control. Thus, the threshold L1 used to determine the illuminance range for executing the retraction control and the threshold L2 used to determine the illuminance range for executing the light blocking control are separately set so as to provide a range therebetween. Thus, between timings t1 and t4, the sun visor body 10 moves to follow changes in the incident angle θ of the incident light but does not move toward the retracted position P1. Further, the sun visor body 10 does not move frequently between the retracted position P1 and the target position.

As shown in FIG. 8(B), the sun visor body 10 of the conventional sun visor device moves in the retracting direction to follow the incident angle θ at timing t5 as the incident angle θ of the detected incident light increases (changes in the +Δθ direction) and sets the retracting direction as the target direction. As the incident angle θ decreases (changes in the −Δθ direction) and the detected incident light sets the projecting direction as the target direction at timing t6, the sun visor body 10 moves in the projecting direction to follow the incident angle θ. As the incident angle θ increases (changes in the +Δθ direction) and the detected incident light sets the retracting direction as the target direction at timing t7, the sun visor body 10 moves in the retracting direction to follow the incident angle θ of the incident light. As the incident angle θ decreases (changes in the −Δθ direction) and the detected incident light sets the projecting direction as the target direction at timing t8, the sun visor body 10 moves in the projecting direction to follow the incident angle θ of the incident light. When the incident angle θ of the incident light does not change at timing t9, the sun visor body 10 is held at the present position. Between timings t5 and t9, the sun visor body 10 is frequently operated to follow the incident angle θ of the incident light having an intermediate illuminance that is more difficult to accurately detect than the incident angle of the incident light having a high illuminance.

In contrast, the sun visor body 10 of the sun visor device 1 of the first embodiment moves after the retracting direction has been continuously set as the target direction for the predetermined time T when the detected incident light sets the retracting direction as the target direction as shown in FIG. 8(A). Thus, even when the incident angle θ of the incident light increases (changes in the +Δθ direction) and the incident light that sets the retracting direction as the target direction is detected at timing t5, the sun visor body 10 is held at the present position.

Further, the sun visor body 10 of the sun visor device 1 of the first embodiment does not move in the retracting direction when incident light that sets the target position closer to the retracted position P1 than the present position θold has not been continuously detected for the predetermined time T. Thus, between timings t5 and t10, even though the present incident angle θ decreases (changes in the −Δθ direction) from the preceding incident angle θ, the sun visor body 10 is tentatively held at the present position if the incident angle θ of the detected incident light is set closer to the retracted position P1 than the present position θold. Thus, even when the incident angle θ decreases (changes in the −Δθ direction) at timing t6, the sun visor body 10 is tentatively held at the present position.

Further, the sun visor body 10 of the sun visor device 1 of the first embodiment moves immediately when the target direction is the projecting direction. Thus, when the incident angle θ of the incident light decreases further and incident light that sets the target position closer to the projected position P2 than the present position θold is detected at timing t10, the sun visor body 10 is moved to follow the change in the incident angle θ of the incident light and immediately arranged at the position where blocking of light by the sun visor body 10 is ensured.

Further, the sun visor body 10 of the sun visor device 1 of the first embodiment moves when the target direction has been continuously set for the predetermined time. More specifically, when incident light that sets the target position closer to the retracted position P1 than the present position θold has been continuously detected for the predetermined time T, the sun visor body 10 moves toward the retracted position P1. Thus, even when the incident angle θ changes at timing t7, the sun visor body 10 is tentatively held at the present position. Then, when incident light that sets the target position closer to the retracted position P1 than the present position θold has been continuously detected for the predetermined time T after timing t7 (timing t11), the sun visor body 10 moves toward the target position set based on the incident angle θ of the incident light. During the period from timing t5 (t5 to t9), the sun visor body 10 is prevented from moving toward the retracted position P1.

The first embodiment has the advantages described below.

(1) When the incident intensity L of the incident light is in the intermediate illuminance range A3, the controller 6 moves the sun visor body 10 toward the target position after the target position of the sun visor body 10 has been continuously set closer to the retracted position P1 or to the projected position P2 than the present position θold for the predetermined time T. More specifically, the controller 6 moves the sun visor body 10 under the condition that the incident angle θ of the incident light is stable. This prevents the sun visor body 10 from being moved frequently to follow the incident angle θ of the incident light having an intermediate illuminance of which incident angle θ is difficult to detect, such as incident light in a shaded location, or to follow the incident angle θ that is unstable. Further, the intermediate illuminance range A3 is set between the high illuminance range A2 (range for immediately moving the sun visor body 10 to the target position to block light) and the low illuminance range A1 (range for retracting the sun visor body 10). This prevents the sun visor body 10 from being moved frequently between the retracted position P1 and the target position, for example, when light having a high illuminance and light having an intermediate illuminance alternately enter the vehicle, such as when the incident light passes through the leaves of trees. This accurately blocks incident light that may dazzle the vehicle occupant without annoying the vehicle occupant.

(2) When the illuminance of the incident light is in the intermediate illuminance range A3, the controller 6 starts moving the sun visor body 10 after the target position of the sun visor body 10 has continuously been set closer to the retracted position P1 than the present position θold for the predetermined time T. Further, when the target position of the sun visor body 10 is set closer to the projected position P2 than the present position θold, the controller 6 immediately starts moving the sun visor body 10 toward the target position. In other words, the sun visor body 10 immediately moves to the target position when the incident angle θ of the incident light is small so that the incident light does not dazzle the vehicle occupant. When the incident angle θ of the incident light is large, even if the sun visor body 10 is not immediately moved, the sun visor body 10 is capable of blocking light. This accurately blocks incident light that may dazzle the vehicle occupant without annoying the vehicle occupant.

Second Embodiment

A second embodiment of the present invention will now be described with reference to the drawings.

In the first embodiment, the controller 6 calculates the target position based on the incident angle θ detected when the target direction of the sun visor body 10 has continuously been set for the predetermined time T in the intermediate illuminance light blocking processing S400.

Figure 9:
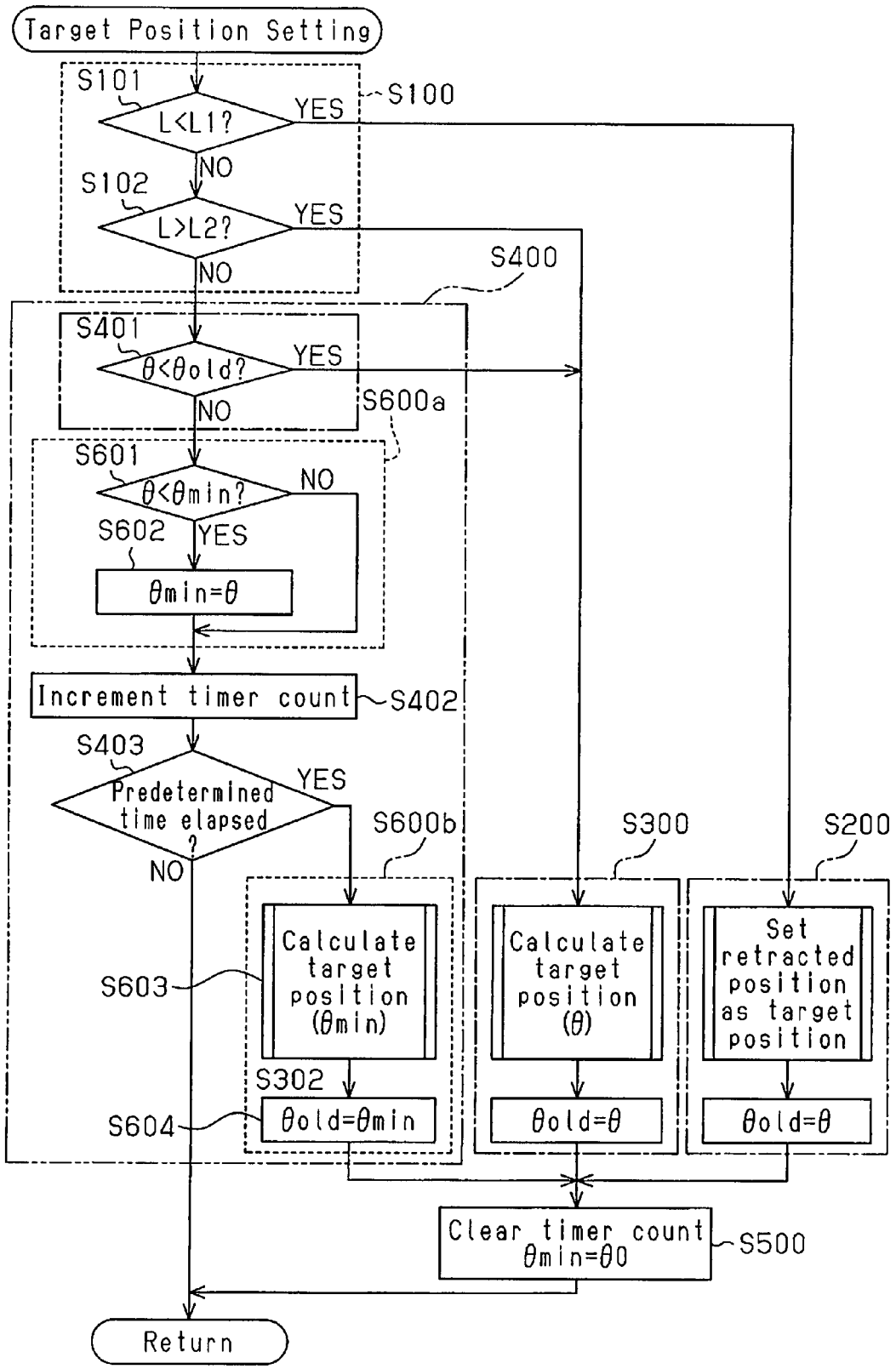
FIG. 9 is a flowchart showing a target position setting process performed by a vehicle sun visor device according to a second embodiment of the present invention.

As shown in FIG. 9, the controller 6 of the second embodiment performs minimum angle updating processing S600a and minimum target value calculation processing S600b during intermediate illuminance light blocking processing S400. The minimum angle updating processing S600a occasionally updates the minimum angle θmin of the incident light detected when the sun visor body 10 is being held at a present position (predetermined time T). The minimum target value calculation processing S600b calculates a target position based on the minimum angle θmin. In the intermediate illuminance light blocking processing S400, the controller 6 calculates the target position based on the minimum value (minimum angle θmin) of the incident angle θ detected during a predetermined time T to arrange the sun visor body 10 at a position closest to the projected position P2.

In detail, in the illuminance range determination processing S100, when an incident intensity L of the detected incident light is determined as being within an intermediate illuminance range A3 and the retracting direction (+Δθ direction) is set as the target direction in step S401, the CPU 21 proceeds to step S601. In step S601, the CPU 21 compares the incident angle θ of the newly detected incident light with the minimum angle θmin stored in the RAM 23. In step S602, when the newly detected incident angle θ is smaller than the minimum angle θmin, the CPU 21 stores the newly detected incident angle θ as the minimum angle θmin and proceeds to step S402. When the newly detected incident angle θ is greater than or equal to the minimum angle θmin, the CPU 21 does not update the minimum angle θmin and proceeds to step S402.

When determining that the target direction of the sun visor body 10 has continuously been set for the predetermined time in step S403, the CPU 21 proceeds to step S603, and calculates a minimum target position based on the minimum angle θmin. The CPU 21 moves the sun visor body 10 toward the target position, and updates the present position of the sun visor body 10 in step S604. In step S500, the CPU 21 initializes the timer count and the minimum angle θmin of the incident light stored in the RAM 23, and temporarily terminates the target position setting process. Then, the CPU 21 performs the illuminance range determination processing S100 again to determine the illuminance range of the incident light detected next.

Figure 10:
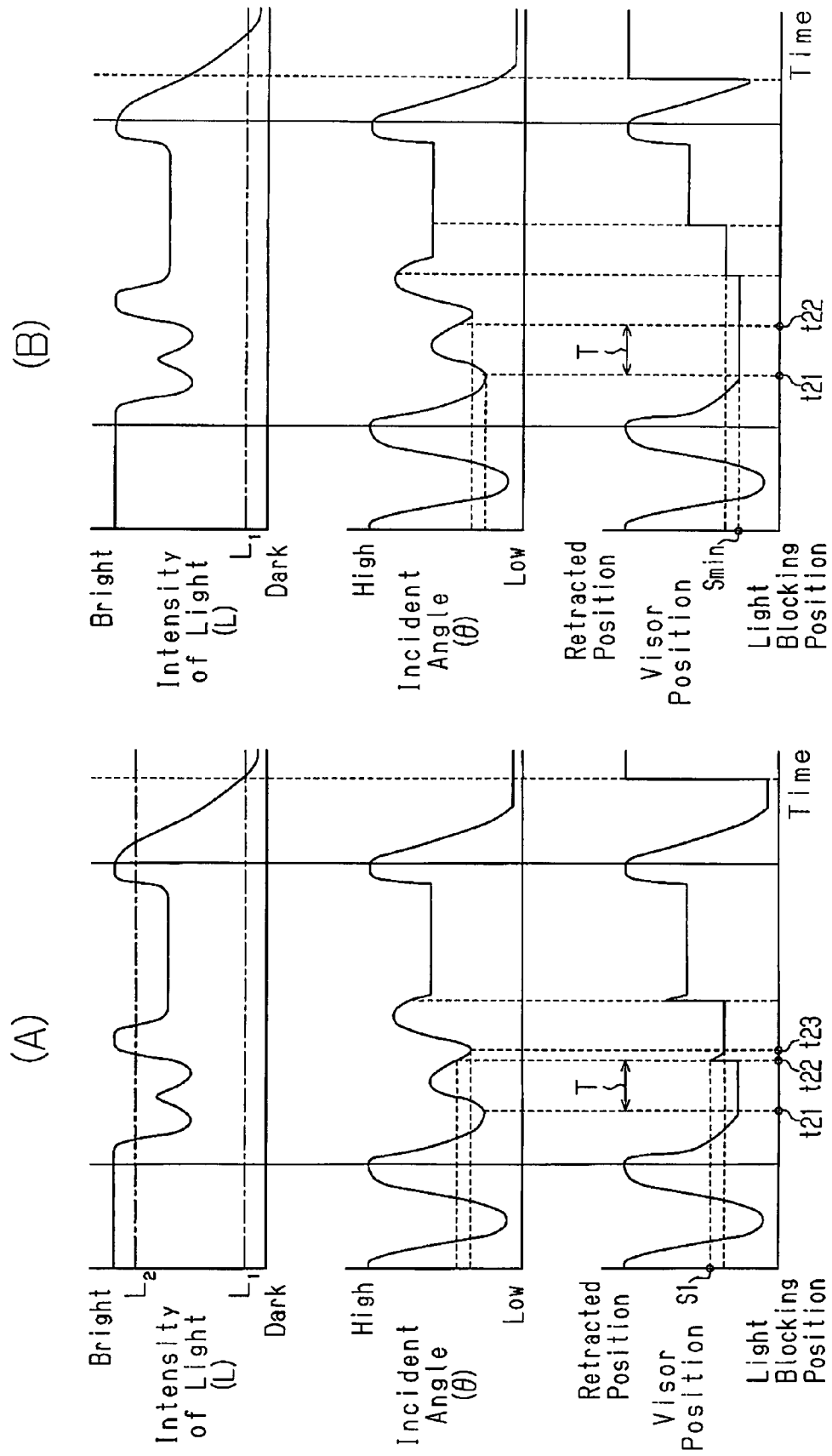
FIG. 10(A) is a diagram showing the effects of the sun visor device.
FIG. 10(B) is a diagram showing the effects of the sun visor device.

The operation of the sun visor device of the second embodiment will now be described in comparison with the sun visor device 1 of the first embodiment. FIG. 10(A) shows the operation of the sun visor device of the first embodiment, whereas FIG. 10(B) shows the operation of the sun visor device 1 of the second embodiment.

As shown in FIG. 10(A), the sun visor body 10 of the sun visor device of the first embodiment is tentatively held at the present position when the incident angle θ of the incident light increases (+Δθ) and the detected incident light detected at timing t21 sets the retracting direction as the target direction. The sun visor body 10 moves toward a target position S1 that is set based on the incident angle θ of the detected incident light when the incident light that sets the target position closer to the retracted position P1 than the present position has continuously been detected for the predetermined time T after timing t21 (t22).

When the incident angle θ of the incident light decreases (−Δθ) and incident light that sets the projecting direction as the target direction is detected at timing t22, the sun visor body 10 moves in the projecting direction to follow the change in the incident angle θ of the incident light. When the incident angle θ of the incident light increases (+Δθ) and incident light that sets the retracting direction as the target direction is detected at timing t23, the sun visor body 10 moves in the retracting direction to follow the change in the incident angle θ of the incident light.

As shown in FIG. 10(B), the sun visor body 10 of the sun visor device of the second embodiment is tentatively held at the present position when the incident angle θ increases (+Δθ) and incident light that sets the retracting direction as the target direction is detected at timing t21. The sun visor body 10 is arranged at a target position Smin calculated based on the minimum angle θmin stored in the RAM 23 when the incident light that sets the target position closer to the retracted position P1 than the present position has continuously been detected for the predetermined time T after timing t21 (timing t22). Thus, the sun visor body 10 is arranged closer to the projected position P2 in the second embodiment than in the first embodiment. The present position is the same as the target position Smin set based on the minimum angle θmin.

At timing t22, even when the incident angle θ of the incident light decreases (−Δθ), the retracting direction is set as the target direction based on the comparison between the present position θold and the incident angle θ of the detected incident light. Thus, the sun visor body 10 is held at the present position.

The second embodiment has the advantages described below.

(1) The target position is determined based on the minimum value (minimum angle θmin) of the incident angle θ of the incident light detected during the predetermined time T. Thus, the sun visor body 10 is arranged at a position at which the sun visor body 10 blocks the incident light detected during the predetermined time T of which incident angle sets the target position closest to the projected position P2 (minimum angle θmin). Thus, the sun visor body 10 is arranged at a position at which the blocking of light by the sun visor body 10 is ensured.

(2) When the retracting direction is set as the target direction, the sun visor body 10 is moved after the retracting direction has continuously been set as the target direction for the predetermined time. Thus, when the target position is set to arrange the sun visor body 10 closest to the projected position P2, the sun visor body 10 does not move in an unnecessary manner in the retracting direction.

Third Embodiment

A third embodiment of the present invention will now be described with reference to the drawings.

Figure 12:
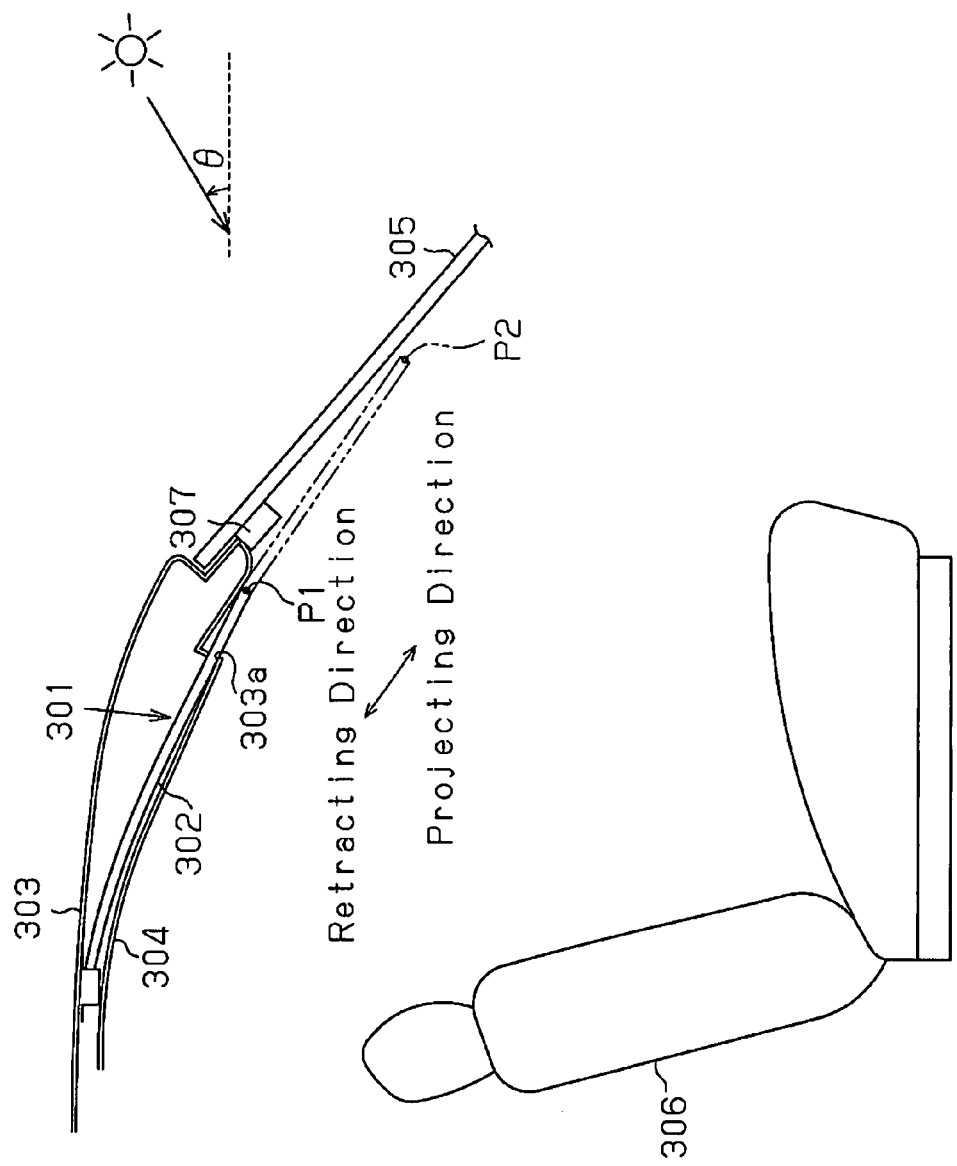
FIG. 12 is a schematic diagram of a vehicle sun visor device according to a third embodiment of the present invention.
Figure 13:
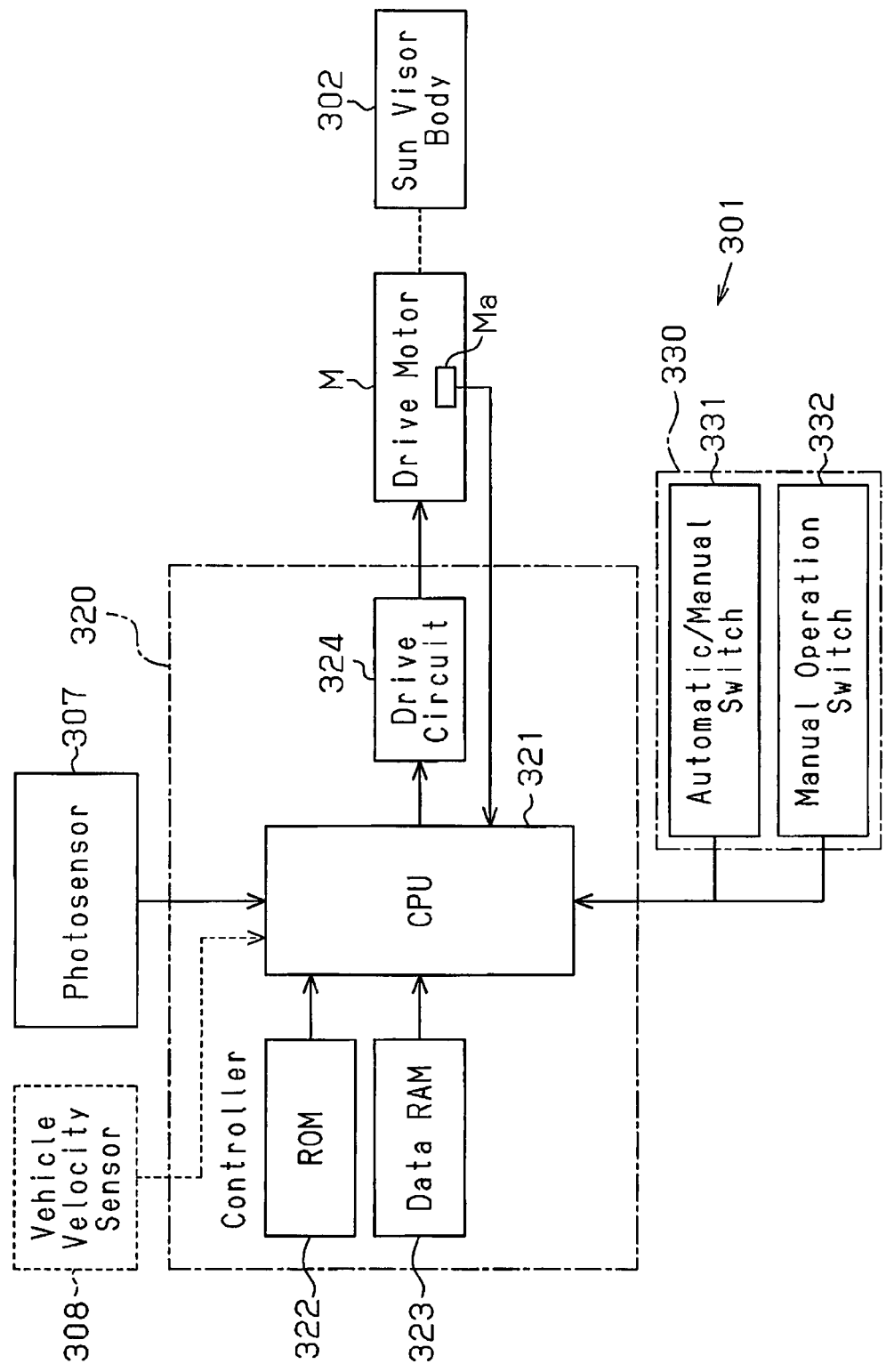
FIG. 13 is a block diagram showing the structure of the sun visor device.

As shown in FIGS. 12 and 13, a sun visor device 301 includes a sun visor body 302 formed by an opaque plate. The sun visor body 302 is capable of projecting from and retracting into a ceiling 304 of a vehicle 303 along a front glass 305. The sun visor body 302 is movable between a retracted position P1 indicated by a solid line and an projected position P2 indicated by a double-dashed line in FIG. 12 when driven by a drive motor M, which functions as a driving means. The sun visor body 302 is arranged at the retracted position P1 when its distal portion is located at an upper portion of the front glass 305. In other words, the sun visor body 302 at the retracted position P1 does not obstruct the view of the driver. When arranged at the projected position P2, the sun visor body 302 does not obstruct the view of the driver and maximizes the blocked amount of the ambient light (sunlight) that enters the front glass 305.

The sun visor device 301 includes a photosensor 307 functioning as an incident light detection means. The photosensor 307 is arranged on an upper end portion of the front glass 305 in the passenger compartment. The photosensor 307 is substantially arranged in front of the driver seat 306. The photosensor 307 sequentially outputs an incident light detection signal for calculating an incident intensity L indicating the illuminance of ambient light and the incident angle θ in the heightwise direction between the ambient light and the horizontal direction (traveling direction of the vehicle 303).

The structure of the sun visor device 301 will now be described with reference to FIG. 13.

As shown in FIG. 13, the sun visor device 301 includes a controller 320 and an input unit 330. The controller 320 includes a CPU 321 functioning as a deviation calculation means, an estimated incident angle calculation means, a control means, a candidate value calculation means, and a determination means. The controller 320 further includes a ROM 322, a data RAM 323 functioning as a storage means, and a drive circuit 324. The ROM 322 stores various data, a basic program for the operation of the CPU 321, and a sun visor drive program for controlling the sun visor body 302.

The CPU 321 performs calculations based on the basic program, the sun visor drive program, or the like stored in the ROM 322. The CPU 321 switches between an automatic mode and a manual mode based on the sun visor drive program. In the automatic mode, the CPU 321 calculates an incident intensity L serving as an incident intensity and an incident angle θ serving as an incident angle in the heightwise direction based on an incident light detection signal from the photosensor 307. The CPU 321 further calculates a target position P0 of the sun visor body 302 based on the incident intensity L and the incident angle θ and generates a control signal for controlling the position of the sun visor body 302 based on the target position P0. The incident intensity L indicates the intensity of incident light, such as sunlight. The incident angle θ is the angle between the horizontal direction and the traveling direction of the incident light.

In the manual mode, the CPU 321 generates a control signal for controlling the position of the sun visor body 302 based on a retracting operation or a projecting operation performed manually. The RAM 323 temporarily stores the calculation results of the CPU 321. The drive circuit 324 reads a control signal generated by the CPU 321 and causes the drive motor M to generate rotation in a forward direction or reverse direction based on the control signal. The sun visor body 302 moves between the retracted position P1 and the projected position P2 when driven by the drive motor M. The sun visor body 302 moves toward the projected position P2 when the drive motor M produces rotation in the forward direction and toward the retracted position P1 when the drive motor M produces rotation in the reverse direction.

The CPU 321 is connected to a rotation detector Ma incorporated in the motor M. The rotation detector Ma outputs a detection signal for calculating the rotation direction and the rotation amount of the drive motor M to the CPU 321. The CPU 321 calculates the drive amount of the motor M based on the detection signal from the rotation detector Ma to obtain the position to which the sun visor body 302 has been moved (present position Pn) based on the drive amount of the motor M.

The CPU 321 is connected to the input unit 330. The input unit 330 includes an automatic/manual switch 331 and a manual operation switch 332. The automatic/manual switch 331 and the manual operation switch 332 are mounted on an installment panel in the passenger compartment. The automatic/manual switch 331 is used to selectively set the manual mode during which the position of the sun visor body 302 is manually controlled or the automatic mode during which the position of the sun visor body 302 is controlled based on the ambient light (incident light detection signal from the photosensor 307). The CPU 321 sets either the manual mode or the automatic mode based on the operation of the automatic/manual switch 331 and stores the set mode into the RAM 323. When the automatic/manual switch 331 is switched to the manual mode, operation of the manual operation switch 332 produces rotation with the drive motor M in the forward direction or the reverse direction to move the sun visor body 302.

Figure 14:
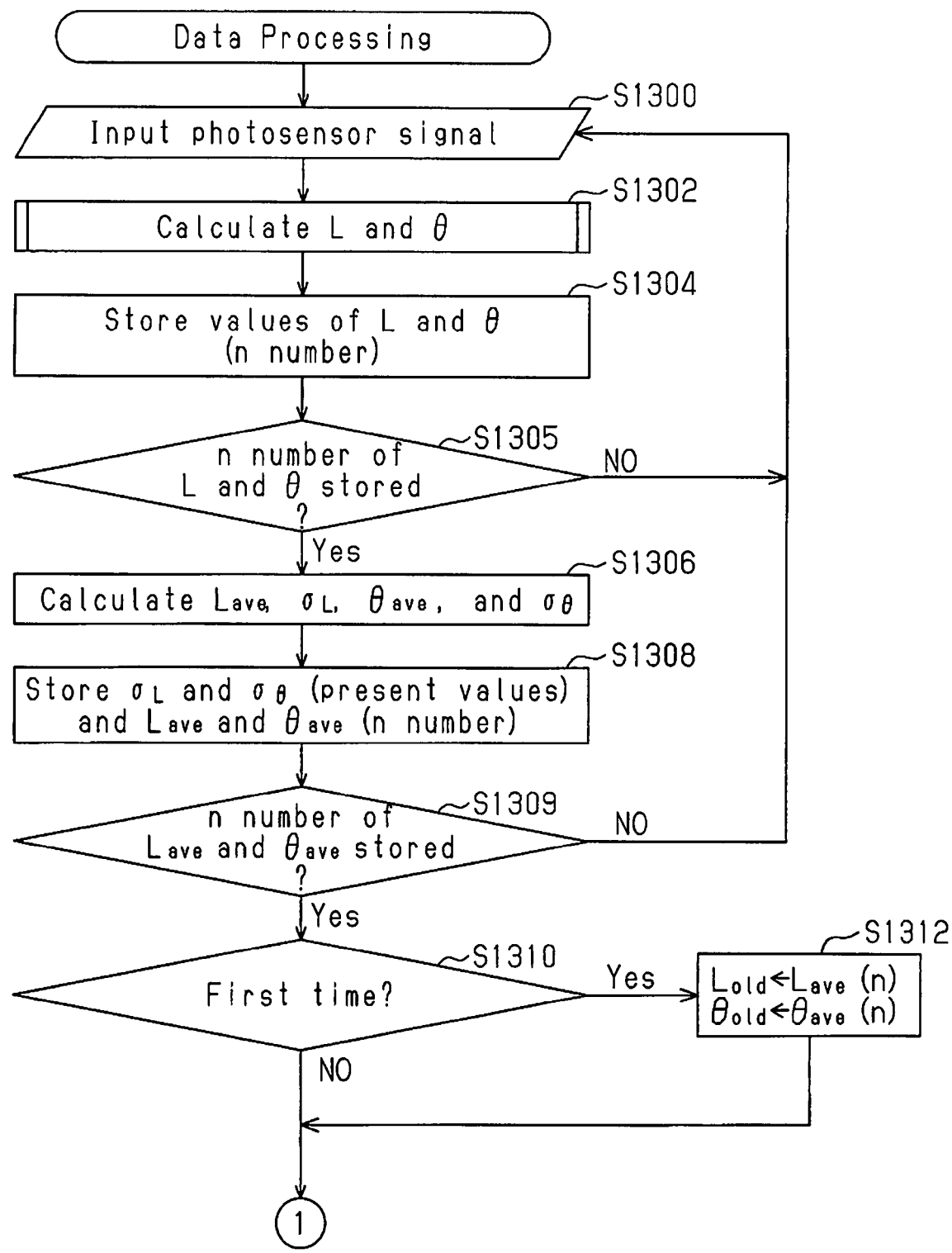
FIG. 14 is a flowchart showing a data processing process.
Figure 15:
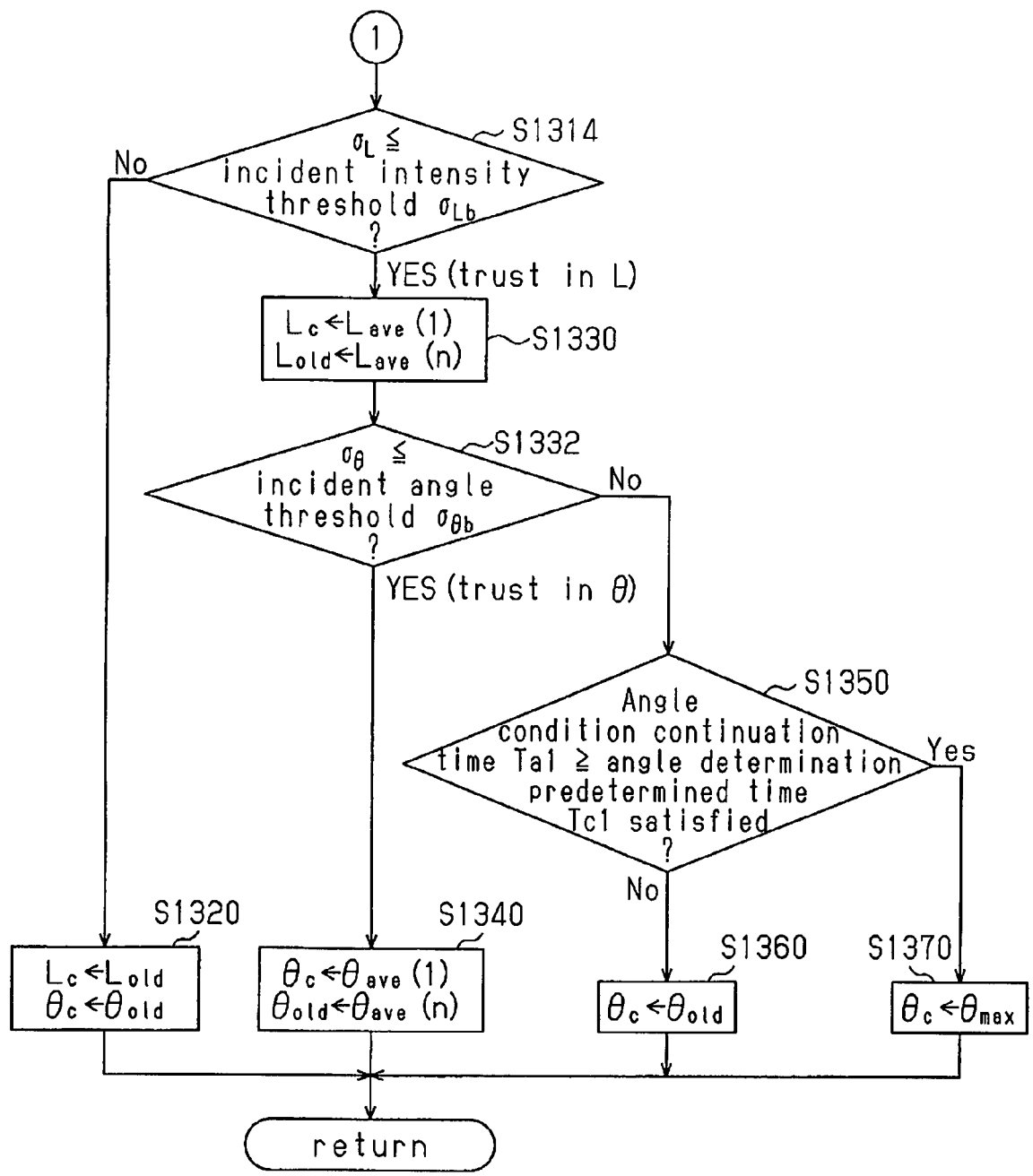
FIG. 15 is a flowchart showing the data processing process following the flowchart of FIG. 14.

The operation of the sun visor device 301 will now be described with reference to FIGS. 14 and 15. FIGS. 14 and 15 show a flowchart describing the processing performed by the controller 320 (CPU 321). To facilitate description, the operating state of the automatic/manual switch 331 is set in the automatic mode.

(Processing for Calculating the Estimated Incident Intensity Lc and the Estimated Incident Angle θc)

The processing for obtaining the estimated incident intensity Lc and the estimated incident angle θc that are practical will first be described. The "estimated incident intensity Lc" and "estimated incident angle θc" are calculated based on the present incident intensity L and the incident angle θ obtained from the incident intensity detection signal of the photosensor 307. The "estimated incident intensity Lc" is a value assumed to be the actual incident intensity L. The "estimated incident angle θc" is the value assumed to be the actual incident angle θ.

When the vehicle is traveling, sunlight may be blocked by the surrounding buildings or trees. In such a case, the present incident intensity L and incident angle θ calculated from the incident light detection signal of the photosensor 307 may not coincide with the actual incident intensity L and incident angle θ. Therefore, the "estimated incident intensity Lc" and the "estimated incident angle θc" that are not affected by such circumstances are obtained through the calculations described below. The "estimated incident intensity Lc" and the "estimated incident angle θc" are used to control the position of the sun visor body 302.

The driver sits on the driver seat 306, inserts a key into the key cylinder, and turns on the accessory switch to activate the sun visor device 301. The CPU 321 then reads the operating state of the automatic/manual switch 31 from the RAM 323 and determines whether the operating state is in the manual mode or the automatic mode. When the operating state is in the automatic mode, the CPU 321 reads the incident light detection signal from the photosensor 307 as shown in FIG. 14 (step S1300). The CPU 321 calculates the incident intensity L and the incident angle θ based on the incident light detection signal (step S1302), and stores the incident intensity L and the incident angle θ in the RAM 323 (step S1304).

When a single incident intensity L and single incident angle θ are stored in the RAM 323, the CPU 321 determines whether an n number of the incident intensities L and an n number of the incident angles θ have been stored in the RAM 323 (step S1305). Hereafter, n, which may be any positive integer, is 20. When an n number of the incident intensities L and n number of the incident angles θ have not been stored (NO in step S1305), the CPU 321 returns to step S1300 and reads the incident light detection signal from the photosensor 307 again, calculates the incident intensity L and the incident angle θ, and stores the calculated values of the incident intensity L and the incident angle θ in the RAM 323 (steps S1302 and S1304). The above calculation is repeated until an n number of the incident intensities L and an n number of the incident angles θ are stored. More specifically, as shown in FIGS. 16(A) and 16(B), an n number of the incident intensities L (L(n), . . . , L(2), and L(1)) are stored in an incident intensity table 401 in a predetermined storage region of the RAM 323. As shown in FIGS. 17(A) and 17(B), an n number of the incident angles θ (θ(n), . . . , θ(2), and θ(1)) are stored in an incident angle table 501 in a predetermined storage region of the RAM 323.

When the incident intensity L and the incident angle θ are newly calculated, the calculated values of the incident intensity L and the incident angle θ are stored as the latest incident intensity L(1) and the latest incident angle θ(1). At the same time, the oldest incident intensity L(n) and the oldest incident angle θ(n) in the RAM 323 are deleted, and the second oldest incident intensity L(n−1) and the second oldest incident angle θ(n−1) in the RAM 323 are set as the oldest incident intensity L(n) and the oldest incident angle θ(n). Accordingly, after an n number of the incident intensities L and an n number of the incident angles θ are stored, the RAM 323 constantly stores an n number of new incident intensities L and an n number of new incident angles θ.

When an n number of the incident intensities L and an n number of the incident angles θ have been stored (YES in step S1305), the CPU 321 calculates an incident intensity average Lave as an estimated incident intensity candidate, an incident intensity standard deviation δL as an incident intensity deviation, an incident angle average θave as an estimated incident angle candidate, and an incident angle standard deviation δθ as an incident angle deviation (step S1306).

The incident intensity average Lave is the average $((L(n)+ \ldots +L(2)+L(1))/n)$ of an n number of the incident intensities L (L(n), . . . , L(2), and L(1)). The incident angle average θave is an average $((\theta(n)+ \ldots +\theta(2)+\theta(1))/n)$ of an n number of the incident angles θ (θ(n), . . . , θ(2), and θ(1)).

The incident intensity standard deviation δL is a standard deviation of the n number of the incident intensities (L(n), . . . , L(2), and L(1)) and obtained, for example, from expression 1.

Expression 1

$$\delta L = \sqrt{\frac{1}{n}\sum_{i=1}^{n}(L(i)-Lave)^2} \quad (1)$$

The incident intensity standard deviation δL indicates the distribution of the n number of the incident intensities L. More specifically, the value of the incident intensity standard deviation δL is smaller as the n number of the incident intensities L are distributed in a narrower range, and the value of the incident intensity standard deviation δL is larger as the n number of the incident intensities L are distributed in a wider range.

For example, when the photosensor 307 continuously receives sunlight, an n number of the incident intensities L are distributed in a narrow range. Thus, the value of the incident intensity standard deviation δL is small. When the photosensor 307 intermittently receives sunlight, an n number of the incident intensities L are distributed in a wide range. Thus, the value of the incident intensity standard deviation δL is large.

The distribution of the light received by the photosensor 307 is quantified as the incident intensity standard deviation δL. Thus, the incident intensity standard deviation δL may be used to determine changes in the level of the light received by the photosensor 307. Accordingly, a large incident intensity standard deviation δL indicates that the light received by the photosensor 307 changes greatly due to the outer environment such as when traveling through an urban area or on a road lined with trees. A small incident intensity standard deviation δL indicates that the light received by the photosensor 307 changes slightly due to the outer environment such as when traveling in the suburbs or through an open area.

The incident angle standard deviation δθ is a standard deviation of the n number of the incident angles θ (θ(n), . . . , θ(2), and θ(1)) and obtained from expression 2.

Expression 2

$$\delta\theta = \sqrt{\frac{1}{n}\sum_{i=1}^{n}(\theta(i)-\theta ave)^2} \quad (2)$$

The incident angle standard deviation δθ indicates the distribution of the n number of the incident angles θ. More specifically, the value of the incident angle standard deviation δθ is smaller when the n number of the incident angles θ are distributed in a narrower range, and the value of the incident angle standard deviation δθ is larger when the n number of the incident angles θ are distributed in a wider range.

For example, when the photosensor 307 continuously receives sunlight, an n number of the incident angles θ are distributed in a narrow range. Thus, the incident angle standard deviation δθ is small. When the photosensor 307 intermittently receives sunlight, an n number of the incident angles θ are distributed in a wide range. Thus, the incident angle standard deviation δθ is large. In the same manner, when the light received by the photosensor 307 is indirect light or has an incident intensity L that is lower than the level required to calculate the incident angle θ, an n number of the incident angles θ are distributed in a wide range. Thus, the value of the incident angle standard deviation δθ is large.

When the light received by the photosensor 307 changes slightly and has an incident intensity L with a level sufficiently enabling calculation of the incident angle θ, the incident angle standard deviation δθ is small. When the incident angle standard deviation δθ is small, the calculated value of the incident angle θ correctly indicates the incident angle θ of the actual incident light. When the light received by the photosensor 307 changes greatly, the light is indirect light or has an incident intensity L that is not high enough to calculate the incident angle θ, the incident angle standard deviation δθ is large. When the incident angle standard deviation δθ is large, the calculated value of the incident angle θ does not correctly indicate the incident angle θ of the actual incident light.

The CPU 321 stores the calculated values of the incident intensity average Lave, the incident angle average θave, the incident intensity standard deviation δL, and the incident angle standard deviation δθ in the RAM 323 (step S1308). Then, the CPU 321 determines whether an n number of the incident intensity averages Lave and an n number of the incident angle averages θave have been stored in the RAM 323 (step S1309).

When an n number of the incident intensity averages Lave and an n number of the incident angle averages θave have not been stored (NO in step S1309), the CPU 21 returns to step S1300 and repeats the processing from steps S1300 to S1308. More specifically, as shown in FIGS. 16(A) and 16(B), the CPU 21 stores an n number of the incident intensity averages Lave (Lave(n), . . . , Lave(2), and Lave(1)) in an incident intensity average table 402 in a predetermined storage region of the RAM 323. As shown in FIGS. 17(A) and 17(B), the CPU 21 stores an n number of the incident angle averages θave (θave(n), . . . , θave(2), and θave(1)) in an incident angle average table 502 in a predetermined storage region of the RAM 323.

When the incident intensity average Lave and the incident angle average θave are newly calculated, the calculated values of the incident intensity average Lave and the incident angle average θave are stored as the latest incident intensity average lave(1) and the latest incident angle average θave(1). At the same time, the oldest incident intensity average Lave (n) and the oldest incident angle average θave(n) in the RAM 323 are deleted, and the second oldest incident intensity average Lave(n−1) and the second oldest incident angle average θave (n−1) in the RAM 323 are set as the oldest incident intensity average Lave(n) and the oldest incident angle average θave(n). Accordingly, after an n number of the incident intensity averages Lave and an n number of the incident angle averages θave are stored, the RAM 323 constantly stores an n number of new incident intensity averages Lave and an n number of new incident angle averages θave.

When an n number of the incident intensity averages Lave and an n number of the incident angle averages θave have been stored (YES in step S1309), the CPU 321 determines whether the determination processing in step S1310 is performed for the first time (step S1310).

When the processing in step S1310 is performed for the first time (YES in step S1310), the CPU 321 sets the oldest incident intensity average Lave(n) among the n number of the incident intensity averages Lave as a past incident intensity Lold in the RAM 323. Further, the CPU 321 sets the oldest one of the n number of the incident angle averages θave, or the incident angle average θave(n), as a past incident angle θold in the RAM 323 (step S1312). The CPU 321 then proceeds to step S1314 (refer to FIG. 15).

When the processing in step S1310 is not performed for the first time (NO in step S1310), the past incident intensity Lold and the past incident angle θold have already been set. Thus, the CPU 321 proceeds to step S1314 without performing the processing of step S1312. After the processing in step S1312 is performed or when the processing in step S1310 is not performed for the first time (NO in step S1310), the CPU 321 determines whether the incident intensity standard deviation δL is less than or equal to an incident intensity threshold δLb (step S1314).

The incident intensity threshold δLb is used to determine whether the light received by the photosensor 307 changes greatly or slightly based on comparison between the incident intensity threshold δLb and the incident intensity standard deviation δL. In accordance with the level of changes in the light received by the photosensor 307, the estimated incident intensity Lc that is optimal for the control of the sun visor body 302 is selected. When the incident intensity standard deviation δL is less than or equal to the incident intensity threshold δLb, the CPU 321 determines that the light received by the photosensor 307 changes slightly due to the outer environment such as when traveling in the suburbs or through an open location. When the incident intensity standard deviation δL exceeds the incident intensity threshold δLb, the CPU 321 determines that light received by the photosensor 307 changes greatly due to the outer environment such as when traveling through an urban area or on a load lined with trees.

When the incident intensity standard deviation δL exceeds the incident intensity threshold δLb (NO in step S1314), the CPU 321 sets the past incident intensity Lold as the estimated incident intensity L and sets the past incident angle θold as the estimated incident angle θ in the RAM 323 (step S1320).

When the incident intensity standard deviation δL is less than or equal to the incident intensity threshold δLb (YES in step S1314), the CPU 321 proceeds to step S1330. The CPU 321 sets the latest one of the n number of the incident intensity averages Lave, or the incident intensity average Lave(1), as the estimated incident intensity Lc and sets the oldest one of the n number of the incident intensity averages Lave, or the incident intensity average Lave(n), as the past incident intensity Lold in the RAM 323 (step S1330).

Subsequently, the CPU 321 determines whether the incident angle standard deviation δθ is less than or equal to an incident angle threshold δθb (step S1332). The incident angle threshold δθb is prestored in the ROM 322 as an incident angle deviation threshold. When the incident angle standard deviation δθ is less than or equal to the incident angle threshold δθb (YES in step S1332), the CPU 321 sets the latest incident angle average θave(1) as the estimated incident angle θc and sets the oldest incident angle average θave(n) as the past incident angle θold in the RAM 323.

The incident angle threshold δθb is a value used to determine the light receiving state of the photosensor 307 based on comparison with the incident angle standard deviation δθ. The incident angle threshold δθb and the incident angle standard deviation δe are compared to determine whether the incident angle θ is correct based on an incident light detection signal from the photosensor 307. The estimated incident angle θc that is optimal for controlling the sun visor body 302 is selected in accordance with the determination result. When the incident angle standard deviation δθ is less than or equal to the incident angle threshold δθb, the CPU 321 determines that the light received by the photosensor 307 changes slightly and that the incident intensity L is high enough to calculate the incident angle θ. As a result, the CPU 321 determines that the incident angle θ has been calculated correctly. When the incident angle standard deviation δθ exceeds the incident angle threshold δθb, the CPU 321 determines that the photosensor 307 receives greatly changing light, indirect light, or light having an incident intensity L that is not high enough to calculate the incident angle θ. As a result, the CPU 321 determines that the incident angle θ is not correctly calculated.

When the incident angle standard deviation δθ exceeds the incident angle threshold δθb (NO in step S1332), the CPU 321 determines whether an angle condition continuation time Ta1 is greater than or equal to an angle determination predetermined time Tc1 prestored in the ROM 322 (step S1350). The angle condition continuation time Ta1 is the time from when the determination processing of step S1350 is performed in the previous cycle to when the same determination processing is started in the present cycle. The angle condition continuation time Ta1 is measured by a timer incorporated in the CPU 321. When the determination processing of step S1350 has not been performed in the previous cycle, the value of the angle condition continuation time Ta1 is cleared.

When the angle condition continuation time Ta1 is less than the angle determination predetermined time Tc1 (NO in step S1350), the CPU 321 stores the past incident angle θold as the estimated incident angle θc in the RAM 323 (step S1360). When the angle condition continuation time Ta1 is greater than or equal to the angle determination predetermined time Tc1 (YES in step S1350), the CPU 321 stores the angle at which sunlight does not directly reach the driver seat 306 (incident angle maximum value θmax) as the estimated incident angle θc in the RAM 323 (step S1370). The incident angle maximum value θmax is prestored in the ROM 322. Thereafter, the CPU 321 repeats the above operation until the accessory switch is turned off.

When the incident intensity standard deviation δL exceeds an incident intensity threshold δLb (NO in step S1314), the light received by the photosensor 307 changes greatly due to the outer environment such as when traveling through an urban area or on a road lined with trees. Thus, the incident intensity L is not correctly calculated from the incident light detection signal of the photosensor 307. Accordingly, the use of the latest incident intensity average Lave(1) including the incident intensity L that cannot be correctly calculated as the estimated incident intensity Lc is not preferable. Further, the light received by the photosensor 307 changes greatly. Thus, the incident angle θ cannot be correctly calculated. In this case, the use of the latest incident angle average θave(1) including the incident angle θ as the estimated incident angle θc is not preferable. Thus, the past incident intensity Lold is used as the estimated incident intensity Lc, and the past incident angle θold is used as the estimated incident angle θc (step S1320).

When the incident intensity standard deviation δL is less than or equal to the incident intensity threshold δLb (YES in step S1314), the light received by the photosensor 307 changes slightly due to the outer environment such as when traveling through the suburbs or an open location. In this case, the incident intensity L is calculated correctly based on the incident light detection signal from the photosensor 307. Thus, the use of the latest incident intensity average Lave(1) including the incident intensity L that is calculated correctly as the estimated incident intensity Lc is preferable. Further, when light received by the photosensor 307 changes slightly and has the incident intensity L that is high enough to calculate the incident angle θ (YES in step S1332), the incident angle θ is correctly calculated. Thus, the use of the latest incident angle average θave(1) including the incident angle θ as the estimated incident angle θc is preferable. In this case, the latest incident intensity average Lave(1) is used as the estimated incident intensity Lc (step S1330), and the latest incident angle average θave(1) is used as the estimated incident angle θc (step S1340).

Further, when the incident intensity standard deviation δL is less than or equal to the incident intensity threshold δLb (YES in step S1314), light received by the photosensor 307 changes slightly due to the outer environment such as when traveling through the suburbs or an open location. In this case, the incident intensity L is calculated correctly based on an incident light detection signal from the photosensor 307. Thus, the use of the latest incident intensity average Lave(1) including the incident intensity L that is calculated correctly as the estimated incident intensity Lc is preferable. However, when the photosensor 307 receives light that changes slightly but the light is indirect light or has an incident intensity L that is not high enough to calculate the incident angle θ (NO in step S1332), the incident angle θ is not correctly calculated. Thus, the use of the latest incident angle average θave(1) including the incident angle θ as the estimated incident angle θc is not preferable. In this case, the latest incident intensity average Lave(1) is used as the estimated incident intensity Lc (step S1330), and the past incident angle θold is used as the estimated incident angle θc (step S1360).

Figure 20:
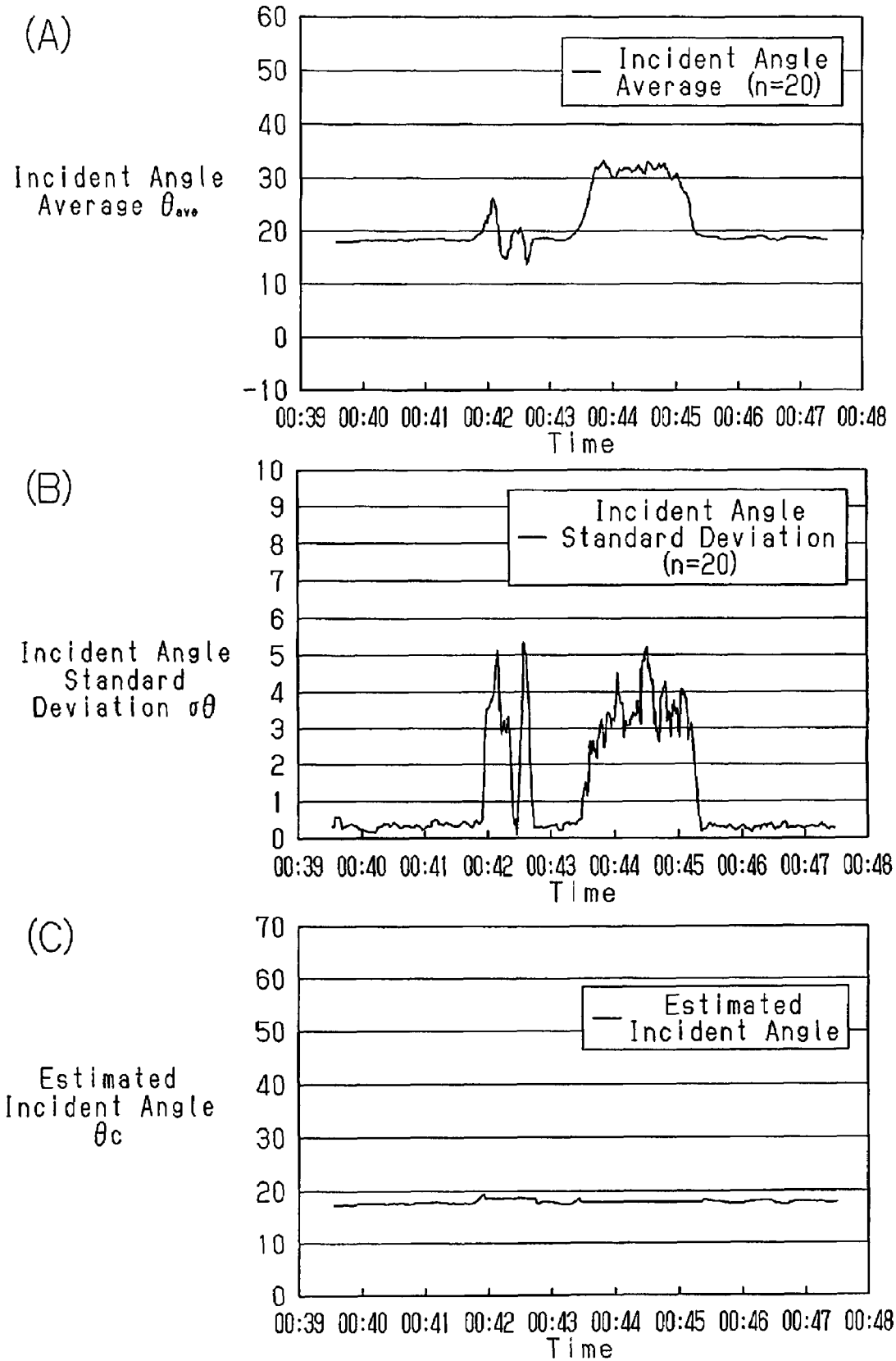
FIG. 20(A) is a diagram showing the effects of the incident intensity data processing.
FIG. 20(B) is a diagram showing the effects of the incident intensity data processing.
FIG. 20(C) is a diagram showing the effects of the incident intensity data processing.

FIG. 19 shows changes in the incident intensity average Lave, the incident intensity standard deviation δL, and the estimated incident intensity Lc obtained through the calculations described above. Referring to FIG. 19, when the vehicle 303 is being driven, sunlight is temporarily blocked by trees from timing 00:42 to timing 00:43 and by a large object from timing 00:44 to past timing 00:45. FIG. 20 shows changes in the incident angle average θave, the incident angle standard deviation δθ, and the estimated incident angle θc obtained through the calculations described above at the same timings as the changes in the incident intensity average Lave, the incident intensity standard deviation δL, and the estimated incident intensity Lc shown in FIG. 19.

As shown in FIG. 20(A), the incident angle average θave changes greatly from timing 00:42 to timing 00:43 and from timing 00:44 to past timing 00:45 even though the position of the sun remains the same. Thus, the use of at least the incident angle average θave from timing 00:42 to timing 00:43 and from timing 00:44 to past timing 00:45 to control the position of the sun visor body 302 is not preferable. The incident intensity average Lave shown in FIG. 19(A) also requires a certain period of time until its value is fixed. Thus, the determination result of whether to block light with the sun visor body 302 may change depending on how the light changes.

Accordingly, the incident intensity standard deviation δL and the incident angle standard deviation δθ are used to calculate the estimated incident intensity Lc and the estimated incident angle θc that are optimal for controlling the position of the sun visor body 302. As shown in FIG. 19(B) and FIG. 20(B), when the photosensor 307 intermittently receives incident light, the calculated values of the incident intensity standard deviation δL and the incident angle standard deviation δθ are large.

The estimated incident intensity Lc shown in FIG. 19(C) changes for shorter periods than the incident intensity average Lave shown in FIG. 19(A). This reduces the possibility of changes occurring in the determination result of whether to block light with the sun visor body 302 due to changes in the estimated incident intensity Lc. Further, the estimated incident angle θc shown in FIG. 20(C) changes only slightly from timing 00:42 to timing 00:43 and from timing 00:44 to past timing 00:45 unlike the incident angle average θave shown in FIG. 20(A). Thus, the use of the estimated incident angle θc to accurately calculate the actual sun position is preferable. Accordingly, the use of the estimated incident intensity Lc and the estimated incident angle θc enables the position of the sun visor body 302 to be controlled without annoying the driver.

(Process for Controlling the Position of the Sun Visor Body 302)

The sun visor position control process for controlling movement of the sun visor body 302 with the estimated incident intensity Lc and the estimated incident angle θc obtained through the above calculations will now be described.

Figure 18:
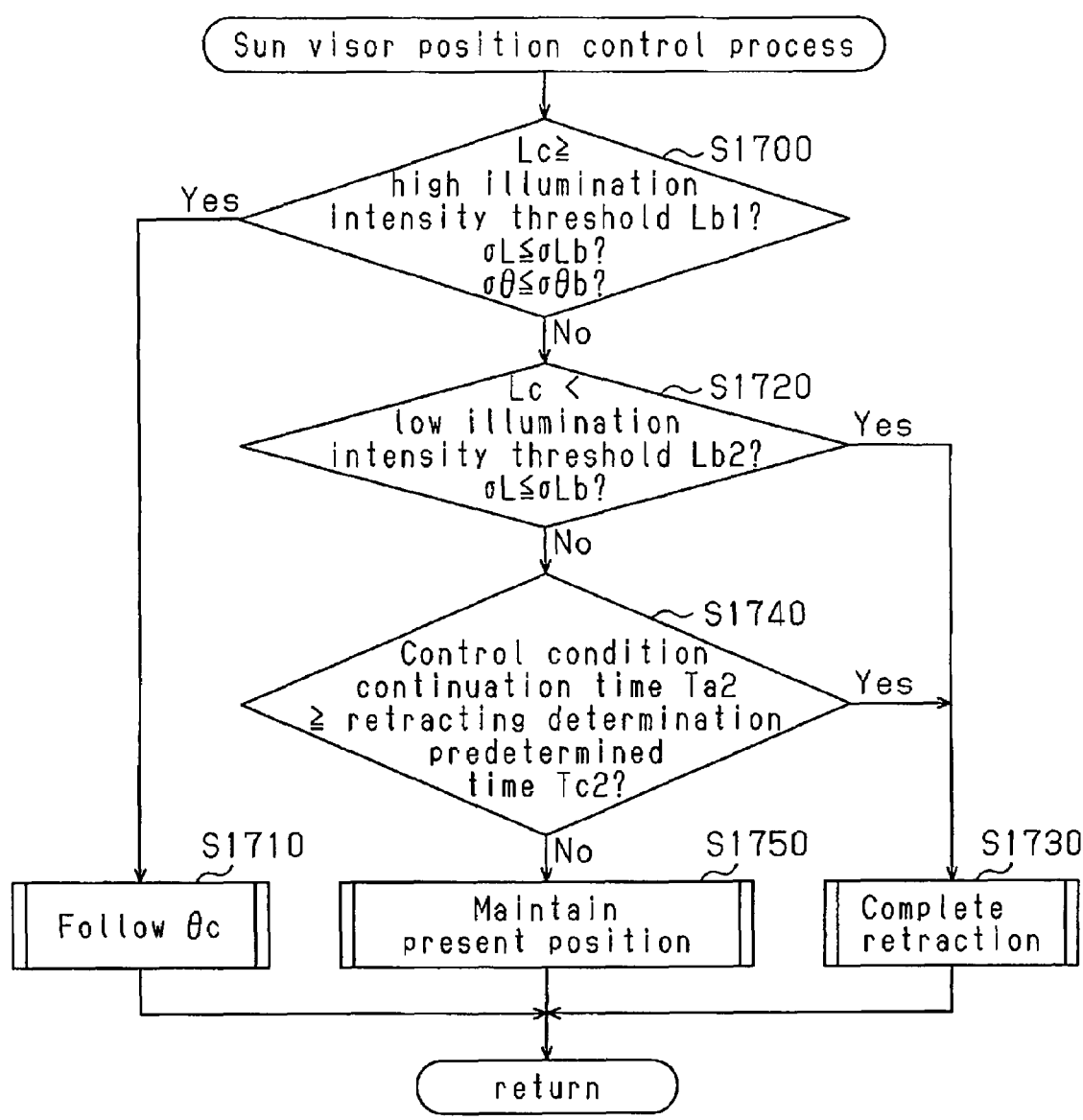
FIG. 18 is a flowchart showing sun visor position control.

As shown in FIG. 18, when the values of the estimated incident intensity Lc and the estimated incident angle θc are sequentially set, the CPU 321 determines whether the estimated incident intensity Lc is greater than or equal to a high illuminance threshold Lb1, whether the incident intensity standard deviation δL is less than or equal to the incident intensity threshold δLb, and whether the incident angle standard deviation δθ is less than or equal to the incident angle threshold δθb (step S1700).

The high illuminance threshold Lb1 is the illuminance of light that a person would perceive as being dazzling, such as the sunlight on a sunny day. In the present embodiment, the high illuminance threshold Lb1 is set at 10000 lux. When the high illuminance threshold Lb1 and the estimated incident intensity Lc are compared and the estimated incident intensity Lc is determined to be greater than the high illuminance threshold Lb1, the ambient illuminance is determined as having a level would be perceived by a person as being dazzling.

When the estimated incident intensity Lc is greater than or equal to the high illuminance threshold Lb1, the incident intensity standard deviation δL is less than or equal to the incident intensity threshold δLb, and the incident angle standard deviation δθ is less than or equal to the incident angle threshold δθb (YES in step S1700), the CPU 321 proceeds to step S1710. More specifically, the CPU 321 determines that the dazzling sunlight is reaching the driver seat at the estimated incident angle θc and controls the position of the sun visor body 302 based on the estimated incident angle θc (step S1710). Based on the estimated incident angle θc, the CPU 321 calculates the target position P0 to which the sun visor body 302 is to be moved to optimally block light. The ROM 322 stores a process for calculating the target position P0 based on the estimated incident angle θc. The ROM 322 has a data table associating values of the estimated incident angle θc with values of the target position P0. The CPU 321 compares the calculated target position P0 with a present position Pn of the sun visor body 302. The CPU 321 then drives the drive motor M to move the sun visor body 302 to the target position P0 and stops the sun visor body 302 at the target position P0.

When at least one of the conditions of the estimated incident intensity Lc not being greater than or equal to the high illuminance threshold Lb1, the incident intensity standard deviation δL not being less than or equal to the incident intensity threshold δLb, and the incident angle standard deviation δθ not being less than or equal to the incident angle threshold δθb is satisfied (NO in step S1700), the CPU 321 proceeds to step S1720. The CPU 321 determines whether the estimated incident intensity Lc is less than a low illuminance threshold Lb2 and the incident intensity standard deviation δL is less than or equal to the incident intensity threshold δLb (step S1720).

The low illuminance threshold Lb2 indicates the illuminance of light that evidently does not need to be blocked by the sun visor body 302 in an outer environment such as during the nighttime or in a tunnel. In the present embodiment, the low illumination threshold Lb2 is set at 1000 lux. When the low illuminance threshold Lb2 and the estimated incident intensity Lc are compared and the estimated incident intensity Lc is determined as being smaller than the low illumination threshold Lb2, the CPU 321 determines that the ambient illuminance does not require light to be blocked by the sun visor body 302. When the estimated incident intensity Lc is less than the high illuminance Lb1 but greater than or equal to the low illuminance threshold Lb2, the CPU 321 determines that the illuminance is such that a person would not perceive as being dazzling in an ambient environment such as at dawn or at nightfall.

When the estimated incident intensity Lc is less than the low illuminance threshold Lb2 and the incident intensity standard deviation δL is less than or equal to the incident intensity threshold δLb (YES in step S1720), the CPU 321 proceeds to step S1730. In this case, the CPU 321 determines, for example, that the vehicle is being driven at nighttime and immediately moves the sun visor body 302 to the retracted position P1 (step S1730).

When either one of the conditions of the estimated incident intensity Lc not being less than the low illuminance threshold Lb2 and the incident intensity standard deviation δL not being less than or equal to the incident intensity threshold δLb is satisfied (NO in step S1720), the CPU 321 proceeds to step S1740. In this case, the CPU 321 determines, for example, that the vehicle is being driven at dawn, under sunlight passing through the branches of trees, or in a direction opposite to the sun. Thus, the CPU 321 determines whether a control condition continuation time Ta2 is greater than or equal to a retracting determination predetermined time Tc2 prestored in the ROM 322 (step S1740). The control condition continuation time Ta2 is the period from when the CPU 321 performs the determination processing in step S1740 in the previous cycle to when the CPU 321 starts the determination processing in the present cycle. The control condition continuation time Ta2 is measured by a timer incorporated in the CPU 321. When the determination processing in step S1740 is not performed in the previous cycle, the value of the control condition continuation time Ta2 is cleared.

When the control condition continuation time Ta2 is greater than or equal to the retracting determination predetermined time Tc2 (YES in step S1740), the CPU 321 determines, for example, that the vehicle is being driven when there are clouds in the sky, in a shaded location, under a structure, or in a direction opposite the sun. Thus, the CPU 321 moves the sun visor body 302 to the retracted position P1 (step S1730)

When the control condition continuation time Ta2 is less than the retracting determination predetermined time Tc2 (NO in step S1740), the CPU 321 determines, for example, that the vehicle is being driven at dawn, under sunlight passing through the branches of trees, or in a direction opposite to the sun. Thus, the CPU 321 maintains the sun visor body 302 at the present position (step S1750). When the position of the sun visor body 302 is controlled through the processing in any one of step S1710, S1730, and S1750, the CPU 321 repeats the above processing until the accessory switch is turned off.

The third embodiment has the advantages described below.

(1) To determine whether the incident intensity L and the incident angle θ change temporarily due to buildings or trees in the surrounding environment, the incident intensity standard deviation δL and the incident angle standard intensity δθ are calculated. When the incident intensity standard deviation δL and the incident angle standard intensity δθ are large, the incident intensity L and the incident angle θ are determined as changing temporarily in a significant manner. When the incident intensity standard deviation δL and the incident angle standard intensity δθ are small, the incident intensity L and the incident angle θ are determined as slightly changing temporarily.

When the incident intensity L or the incident angle θ changes temporarily, the latest incident intensity average Lave(1) and the latest incident angle average θave(1) affected by the incident intensity L and the incident angle θ are not used as the estimated incident intensity Lc or the estimated incident angle θc to control the position of the sun visor body 302. In this case, the past incident intensity Lold and the past incident angle θold is instead used as the estimated incident intensity Lc and the estimated incident angle θc.

As a result, the estimated incident intensity Lc or the estimated incident angle θc is not affected by the latest incident intensity L or the latest incident intensity θ that changes temporarily. This prevents the sun visor body 302 from moving frequently and enables the position of the sun visor body 302 to be controlled without annoying the driver.

(2) When the intensity of the incident light changes greatly or when the incident light is indirect light, the calculated incident angle θ changes temporarily in a significant manner. In this case, the incident intensity standard deviation δL is used to determine whether the calculated incident angle θ changes temporarily. More specifically, when the incident intensity standard deviation δL is large, the intensity of the incident light may be changing greatly or the incident light may be indirect light. In this case, the incident angle θ is determined as changing temporarily. As a result, when the incident intensity standard deviation δL is large, the calculated incident angle θ is determined as not coinciding with the actual incident angle. In this case, the incident angle average θave(1) including the latest incident angle θ is not used as the estimated incident angle θc, and the oldest incident angle θold is used as the estimated incident angle θc.

Accordingly, the estimated incident angle θc used to control the sun visor body 302 is not affected by the incident angle θ, which is set when the intensity of the incident light changes greatly or when the incident light is indirect light. As a result, even when the intensity of the incident light changes greatly or when the incident light is indirect light, the sun visor body 302 does not move frequently, and the position of the sun visor body 302 is optimally controlled without annoying the driver.

(3) When the incident intensity standard deviation δL and the incident angle standard deviation δθ is large, the latest incident intensity average Lave and the latest incident angle average θave are not used as the estimated incident intensity Lc and the estimated incident angle θc. In such a case, the past incident intensity Lold and the past incident angle θold are used as the estimated incident intensity Lc and the estimated incident angle θc. More specifically, the incident intensity average Lave or the incident angle average θave that may cause the sun visor body 302 to move frequently is not used to control the position of the sun visor body 302. This prevents the sun visor body 302 from moving frequently and enables the position of the sun visor body 302 to be controlled without annoying the driver.

(4) The estimated incident intensity Lc is compared with the high illuminance threshold Lb1 and with the low illuminance threshold Lb2, and the values of the incident intensity standard deviation δL and the incident angle standard deviation δθ are used to determine the driving condition of the vehicle, such as a state in which the vehicle is being driven on a sunny day, at dawn, at night, under sunlight passing through the branches of trees, or in a direction opposite to the sun. In other words, the ambient illuminance state is optimally determined in a manner close to the perception of a person. This enables the automatic sun visor device to control the position of the sun visor body 302 in an optimal manner and increase the comfort of the driver without annoying the driver.

The above embodiments may be modified in the following forms.

In the first and second embodiments, the range of the incident intensity L is divided into the three ranges using the two thresholds L1 and L2. Alternatively, as shown in FIG. 7 for example, a third threshold L3 (e.g. 4000 lx) may be set between the first threshold L1 and the second threshold L2. In this case, the intermediate illuminance range A3 is divided into a first intermediate illuminance range A3a, which is a range above the third threshold L3, and a second intermediate illuminance range A3b, which is a range below the third threshold L3. When the intensity of incident light is within the first intermediate illuminance range A3a and the target position is set closer to the retracted position P1 than the present position θold of the sun visor body 10, the sun visor body 10 moves after the target position is continuously set closer to the retracted position P1 for a predetermined time. The sun visor body 10 moves immediately when the target position is set closer to the projected position P2 than the present position θold. When the intensity of incident light is within the second intermediate illuminance range A3b and the target position is set closer to the retracted position P1 than the present position θold or the target position is set closer to the projected position P2 than the present position θold, the sun visor body 10 moves only after the target position has continuously been set closer to the retracted position P1 or the projected position P2 for a predetermined time.

With this structure, when incident light having the incident intensity L within the first intermediate illuminance range A3a is detected and the target position is set closer to the projected position P2 than the present position θold, the controller 6 immediately moves the sun visor body 10. More specifically, when the intensity of the incident light is within the first intermediate illuminance range A3a, which is a range above the second intermediate illuminance range A3b, the sun visor body 10 moves immediately to the target position if the incident angle θ of the incident light decreases. This prevents the vehicle occupant from being dazzled by the incident light. When incident light having the incident intensity L within the second intermediate illuminance range A3b is detected, the controller 6 does not immediately move the sun visor body 10 even if the target position is set closer to the retracted position P1 or the projected position P2 than the present position θold. The controller 6 starts moving the sun visor body 10 only after the target position has continuously been set closer to the retracted position P1 or the projected position P2 for a predetermined time T. In this case, when the intensity of incident light is within the second intermediate illuminance range A3b, which is below the illumination intensities of the first intermediate illuminance range A3a, the sun visor body 10 is prevented from moving frequently to follow changes in the incident angle θ of the incident light that is less likely to dazzle the vehicle occupant and difficult to accurately detect. This enables the sun visor device 1 to further accurately block light without annoying the vehicle occupant.

Figure 11:
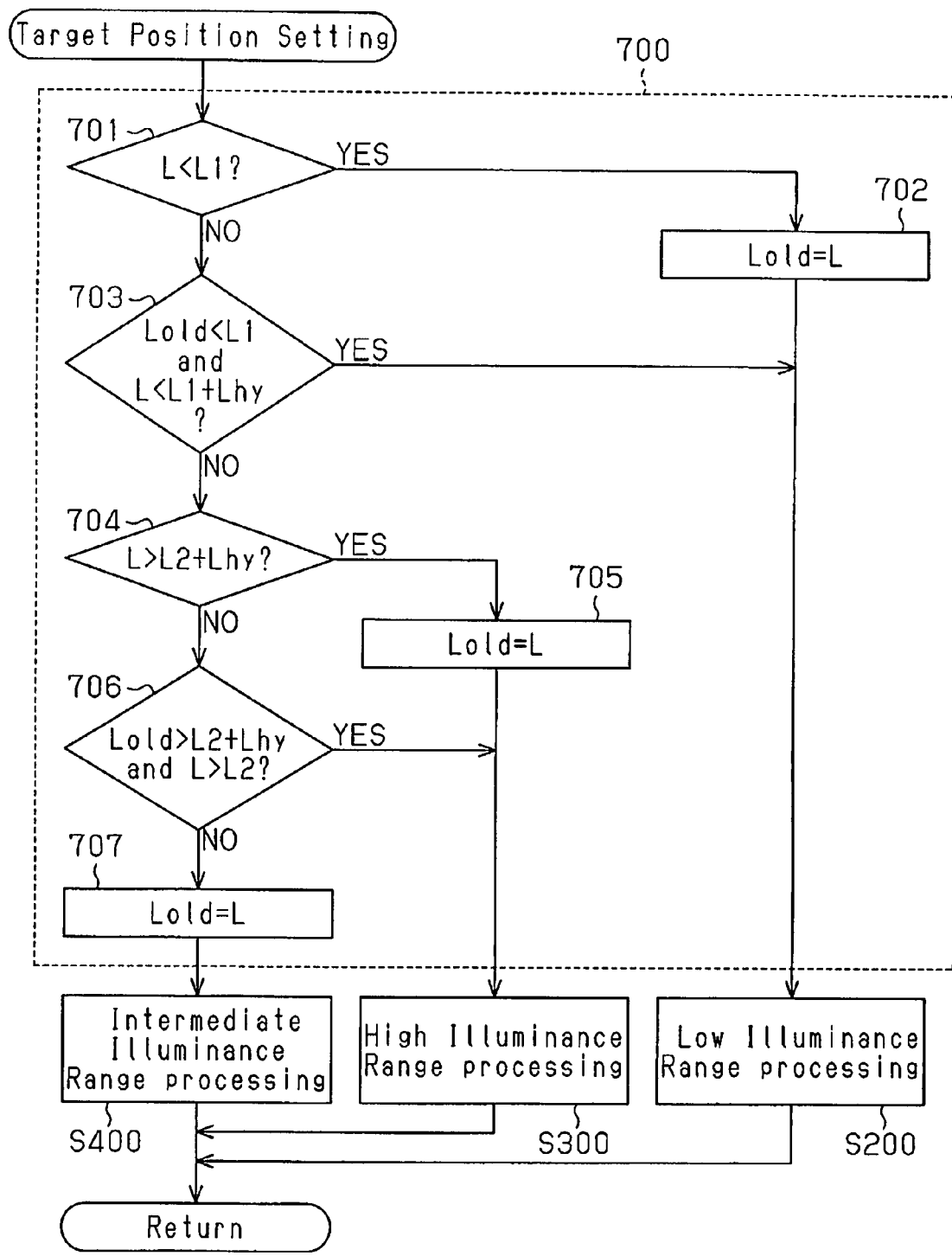
FIG. 11 is a flowchart showing another example of a target position setting process.

In the first and second embodiments, each of the thresholds L1 and L2 used to determine the range of the incident intensity L of incident light may have hysteresis of a fixed value. FIG. 11 shows range determination processing (S700) for determining the range of the incident intensity L of incident light when each threshold has hysteresis. A RAM 23 stores an incident intensity Lold of incident light detected when a sun visor body 10 is arranged at a present position. Hereafter, the incident intensity of the presently detected incident light is referred to as a present incident intensity L, and an incident intensity Lold of the incident light detected when the sun visor body 10 is arranged at the present position is referred to as a previous incident intensity Lold.

First, the CPU 21 compares the present incident intensity L with the threshold L1 in step S701. When the present incident intensity L is less than the threshold L1, the CPU 21 proceeds to step S702, and stores the present incident intensity L as the previous incident intensity Lold. The CPU 21 then determines that the present incident intensity L is within a low illuminance range A1, and performs retracting processing S200.

When the present incident intensity is greater than or equal to the threshold L1, the CPU 21 proceeds to step S703. In step S703, the CPU 21 compares the previous incident intensity Lold with the first threshold L1, and further compares a sum of the first threshold L1 and an illuminance hysteresis value Lhy with the present incident intensity L. When the previous incident intensity Lold is less than the first threshold L1 and the present incident intensity L is less than the sum of the first threshold L1 and the illuminance hysteresis value Lhy, the CPU 21 determines that the present incident intensity L is within the low illuminance range A1, and performs the retracting processing S200.

When the previous illuminance Lold is greater than or equal to the first threshold L1 or when the present incident intensity L is greater than the sum of the first threshold L1 and the illuminance hysteresis value Lhy, the CPU 21 proceeds to step S704. The CPU 21 compares the sum of the second threshold L2 and the illuminance hysteresis value Lhy with the present incident intensity L in step S704. When the present incident intensity L is greater than the sum of the second threshold L2 and the illuminance hysteresis value Lhy, the CPU 21 proceeds to step S705 and stores the present incident intensity L as the previous incident intensity Lold. The CPU 21 then determines that the present incident intensity L is in the high illuminance range A2 and performs high illuminance light blocking processing S300.

When the present incident intensity L is less than or equal to the sum of the second threshold L2 and the illuminance hysteresis value Lhy, the CPU 21 proceeds to step S706. In step S706, the CPU 21 compares the sum of the second threshold L2 and the hysteresis value Lhy with the previous incident intensity Lold and compares the second threshold L2 with the present incident intensity L. When the previous incident intensity Lold is greater than the sum of the second threshold L2 and the hysteresis value Lhy, and the present incident intensity L is greater than the second threshold L2, the CPU 21 determines that the present incident intensity L is in the high illuminance range A2, and performs the high illuminance light blocking processing S300.

When the previous incident intensity Lold is less than or equal to the sum of the second threshold L2 and the hysteresis value Lhy or the present incident intensity L is less than or equal to the second threshold L2 in step S706, the CPU 21 proceeds to step S707 and stores the present incident intensity L as the previous incident intensity Lold. The CPU 21 then determines that the present incident intensity L is in the intermediate illuminance range A3 and performs intermediate illuminance light blocking processing S400.

As described above, the thresholds L1 and L2 having hysteresis used to set the illuminance range enable the control condition set for each of the ranges A1, A2, and A3 of the incident intensity L to be continued more easily. This prevents the incident intensity L of incident light from fluctuating around the thresholds L1 and L2 and frequently changing the control conditions, and prevents the operation of the sun visor body 10 from becoming unstable. The hysteresis value Lhy is not limited to a fixed value, and may be set, for example, as a value increasing logarithmically in accordance with the incident intensity L.

In the first and second embodiments, a vehicle velocity detection means for detecting the velocity of the vehicle may be employed, and the predetermined time T may be set in accordance with the vehicle velocity V. The surrounding environment changes in accordance with the vehicle velocity V. Thus, association of changes in the vehicle velocity with changes in the incident intensity of incident light enables the sun visor body 10 to operate in a further optimal manner in accordance with the surrounding environment of the vehicle. In this case, it is preferred that the predetermined time T be changed within a range of 10 to 30 seconds. It is further preferred that the predetermined time T be longer as the vehicle velocity V becomes lower. When the vehicle velocity V is higher than a predetermined velocity V1, the predetermined time T is set at a fixed time T0. When the vehicle velocity V is lower than the predetermined velocity V1, the predetermined time T is set to be longer as the vehicle velocity V decreases (e.g. $T=T0+a(V1-V)(V<V1)$). Further, the predetermined time T may be set in inverse proportion to the vehicle velocity V ($T=T0+a/V$) so that the predetermined time T becomes longer as the vehicle velocity decreases. Further, the predetermined time T may be changed based on a table associating the vehicle velocity V and the predetermined time T.

In the first and second embodiments, the photosensor 5 outputs to the controller 6 an incident light detection signal for detecting the incident intensity (illuminance) of incident light that enters the measurement range A, the incident angle of the incident light in the heightwise direction, and the incident angle of the incident light in the horizontal direction, and the controller 6 detects the incident intensity of the incident light, the incident angle $\theta$ in the heightwise direction, and the incident angle in the horizontal direction. Alternatively, the photosensor 5 may detect the incident intensity of the incident light, the incident angle $\theta$ in the heightwise direction, and the incident angle in the horizontal direction, and output the detection results to the controller 6.

In the first and second embodiments, the sun visor device 1 may be arranged for passenger seated on a passenger seat.

In the third embodiment, the target position P0 for blocking light is obtained using the table stored in the ROM 332. Alternatively, the target position P0 may be calculated using a program for calculating the target position P0. In this case, the target position P0 is calculated in an optimal manner according to the height or the positioning of the vehicle occupant so that the position of the sun visor body 302 is controlled in a further optimal manner.

In the third embodiment, the n number of the incident intensities L necessary to calculate the incident intensity average Lave is 20, the n number of the incident angles $\theta$ necessary to calculate the incident angle average $\theta$ave is 20, the n number of the incident intensities L necessary to calculate the incident intensity standard deviation $\delta L$ is 20, and the n number of the incident angles $\theta$ necessary to calculate the incident angle standard deviation $\delta\theta$ is 20. However, the n number may be any positive integer. Further, the n number may be changed in accordance with the averages and standard deviations that are calculated. This would enable adjustment of the calculation results of the incident intensity average Lave, the incident angle average $\theta$ave, the incident intensity standard deviation $\delta L$, and the incident angle standard deviation $\delta\theta$ that are used for the control of the sun visor position. More specifically, parameters may be set freely to obtain the calculation results of the average values or of the standard deviations that are optimal for controlling the sun visor position.

In the third embodiment, the incident intensity average Lave is used as the estimated incident intensity candidate. Further, the incident angle average $\theta$ave, the past incident intensity Lold, and the past incident intensity angle $\theta$old are used as the estimated incident angle candidate. However, the estimated incident intensity candidate and the estimated incident angle candidate may be other values that can be assumed as actual values showing the actual light receiving state of the incident light. For example, the incident intensity L or the incident angle $\theta$ of the incident light detected presently may be used as the estimated incident intensity candidate or the estimated incident angle candidate.

In the third embodiment, the incident intensity standard deviation $\delta L$ and the incident angle standard deviation $\delta\theta$ are calculated as the deviation of the incident intensity L and the deviation of the incident angle $\theta$. Alternatively, the sum of squared deviation of the incident intensity L or the incident angle $\theta$ or the variance of the incident intensity L or the incident angle $\theta$ may be calculated as the deviation of the incident intensity L or the deviation of the incident angle $\theta$, and may be used as the incident intensity standard deviation $\delta L$ or the incident angle standard deviation $\delta\theta$. In this case, the position control of the sun visor body 302 is executed using the optimal distribution calculation method.

In the third embodiment, the incident intensity threshold $\delta Lb$ is set at 5 and the incident angle threshold $\delta\theta b$ is set at 1. However, the incident intensity threshold $\delta Lb$ and the incident angle threshold $\delta\theta b$ may be set at other values. This enables the distribution of the incident intensity L or the distribution of the incident angle $\theta$ to be determined based on a determination condition that is more optimal for controlling the position of the sun visor body 302. This further enables each threshold to be set at an optimal value in accordance with the distribution calculation method so that the distribution of the incident intensity L or the distribution of the incident angle $\theta$ is determined in an optimal manner.

In the third embodiment, the high illuminance threshold Lb1 is set at 10000 lux, which is a level that a person would perceive as being dazzling. The low illuminance threshold Lb2 is set at 1000 lux, which is a level that does not need light blocking by the sun visor body 302. However, the high illuminance threshold Lb1 and the low illuminance threshold Lb2 may be set freely at other values. This enables the position of the sun visor body 302 to be controlled in an optimal manner in accordance with the perception of the illuminance of each vehicle occupant.

In the third embodiment, the sun visor body 302 is accommodated in the ceiling 304 of the vehicle 303. However, the sun visor body 302 may be arranged outside the ceiling 304 within the passenger compartment. This simplifies the structure of the ceiling 304 of the vehicle. Alternatively, the sun visor body 302 may be removable from the vehicle 303. This increases the design freedom of the sun visor device 301.

In the third embodiment, the sun visor body 302 may also be arranged at positions separated from the driver seat 306. For example, the sun visor body 302 may be arranged for the passenger seat, a side portion of the vehicle 303, or a rear window of the vehicle 303. The sun visor body 302 arranged at such positions blocks light entering each directions in an optimal manner and increases the comfort of the vehicle occupants in the vehicle 303.

In the third embodiment, the sun visor body 302 is rectangular and formed from an opaque material. Alternatively, the sun visor body 302 may be formed from a semi-transparent material or a material that can change the light transmission state of the sun visor body 302 such as liquid crystal. In this case, the sun visor device 301 includes the sun visor body 302 formed from an optimal material.

In the third embodiment, the sun visor device 301 may be mounted on a structure other than the vehicle that needs to block light. For example, the sun visor device 301 may be arranged on a building. This provides a sun visor device 301 that optimally controls the position of the sun visor body 302 in a building or the like.

In the third embodiment, the incident intensity L and the incident angle θ in the heightwise direction are obtained based on an incident light detection signal from the photosensor 307. In addition, the incident angle in the horizontal direction may also be detected. Obtaining the average of the incident angle in the horizontal direction and its incident angle standard deviation and obtaining the estimated incident angle in the horizontal direction enables the position of the sun visor body 302 to be controlled further accurately.

In the third embodiment, the sun visor body 302 is formed using a rectangular plate. Alternatively, the sun visor body 302 may be formed using a plate material having rigidity or using a curtain without rigidity depending on the mounting position of the sun visor device 301. This enables the sun visor device 301 to include the sun visor body 302 formed from a material optimal for the mounting position of the sun visor device 301.

In the third embodiments, the movement of the sun visor body 302 is controlled to block light having a high illuminance and is controlled not to block light having a low illuminance. However, the movement of the sun visor body 302 may be controlled in an opposite manner so as not to block light having a high illuminance and to block light having a low illuminance. In this case, the sun visor device 301 hides the interior of the vehicle 303 or a building from the outer side.

In the third embodiment, the incident intensity standard deviation δL and the incident angle standard deviation δθ are obtained and used to calculate the estimated incident angle δ. However, the estimated incident angle θc may be calculated using either the deviation of the incident intensity standard deviation δL or the deviation of the incident angle standard deviation δθ.

In the third embodiment, the incident intensity L and the incident angle θ may be calculated cyclically (with the number of calculations per unit time being fixed). Further, the number of calculation per unit time of the incident intensity L and the incident angle θ may be changed in accordance with the vehicle velocity.

The CPU 321 of the controller 320 may read a vehicle velocity signal from a velocity sensor 308 functioning as a vehicle velocity detection means (indicated by broken lines in FIG. 13) to obtain present vehicle velocity information. More specifically, the outer environment constantly changes when driving of the vehicle. The time for which the outside environment changes (e.g., the time for which the same object shades the photosensor 307) is shorter as the vehicle velocity becomes higher. In other words, the time for which the outer environment changes is in inverse proportion to the vehicle velocity. Accordingly, a control interval T may be set to be shorter as the vehicle velocity increases when controlling the sun visor position shown in FIG. 18 (control interval change means).

The sun visor position control described above is executed based on the calculated values of the estimated incident intensity Lc and the estimated incident angle θc. The number of calculation per unit time of the incident intensity L and the incident angle θ that are used to obtain the estimated incident intensity Lc and the estimated incident angle θc is set to be larger as the vehicle velocity increases. More specifically, an increase in the number of calculations per unit time of the incident intensity L and the incident angle θ increases the number of calculations per unit time of the incident intensity average Lave and the incident angle average θave (the incident intensity standard deviation δL and the incident angle standard deviation δθ as well in this case), and further increases the calculation number of times per unit time of the estimated incident intensity Lc and the estimated incident angle θc. As a result, the estimated incident intensity Lc and the estimated incident angle θc are calculated at shorter intervals as the vehicle velocity increases. This improves the capability of the sun visor body 302 to follow changes in the outer environment. Further, the change in the number of calculations per unit time of the incident intensity L and the incident angle θ enables the control interval T to be easily changed.

As indicated by a broken line in FIG. 21(A), the control interval T may be set exponentially shorter along an ideal curve A as the vehicle velocity increases. The ideal curve A, which shows an infinite value when the vehicle is stopped, maximally approaches zero as the vehicle velocity increases. Thus, an upper limit value T1 and a lower limit value T2 are set, and the control interval T is changed along the ideal curve A within a range between the upper limit value T1 and the lower limit value T2.

As shown in FIG. 21(B), the control interval T may be changed in a stepped manner when in a range between the upper limit value T1 and the lower limit value T2. As shown in FIG. 21(C), the control interval T may be changed linearly along a straight line representing a negative linear function in a range between the upper limit value T1 and the lower limit value T2. In this case, the processing for determining the control interval T is simpler than the processing required by the control interval changing pattern shown in FIG. 21(A). Further, the control interval T may be changed in accordance with the vehicle velocity. In this case, the timings at which the sun visor position is controlled may be set in accordance with the driving distance of the vehicle.

In the third embodiment, the incident intensity average Lave, the incident intensity standard deviation δL, the incident angle average θave, and the incident angle standard deviation δθ are calculated using an n number of the incident intensities L and the incident angle θ. However, the n number of the incident intensities L and the incident angle θ may be changed in accordance with the vehicle velocity.

The outer environment may change frequently or the deviations of the incident intensity L and the incident angle θ may increase as the vehicle velocity increases. Thus, the n number of the incident intensities L and the incident angle θ used to obtain the averages Lave and θave and the standard deviations δL and δθ may be set to be greater as the vehicle velocity increases (changing means). This improves the stability of the averages Lave and θave and the standard deviations δL and δθ, and stabilizes the operation of the sun visor body 302 with respect to changes in the vehicle velocity. This modification may be combined with the above modifications for changing the control interval T according to the vehicle velocity.

The invention claimed is:

1. An automatic sun visor device including a sun visor body for blocking incident light entering a passenger compartment from the exterior and a driving device for moving the sun visor body, wherein the sun visor body is movable between a retracted position at which the sun visor body is retracted into the passenger compartment and a projected position at which the sun visor body is most projected frontward from the retracted position, the device comprising:
an incident light detector for detecting incident intensity and incident angle of the incident light;
a position detector for detecting a position of the sun visor body; and
a controller for controlling movement of the sun visor body with the driving device, wherein:
the controller moves the sun visor body toward a target position that is set based on the incident angle when the incident intensity is in a high illuminance range that is above a predetermined value;
the controller moves the sun visor body toward the retracted position when the incident intensity is in a low illuminance range that is below the predetermined value;
the controller sets an intermediate illuminance range between a first threshold for determining whether or not the incident intensity is in the low illuminance range and a second threshold for determining whether or not the incident intensity is in the high illuminance range; and
the controller moves the sun visor body toward the target position after the target position is continuously set closer to the retracted position or the projected position than the position of the sun visor body for a predetermined time when the incident intensity is in the intermediate illuminance range.

2. The automatic sun visor device according to claim 1, wherein:
the controller sets a third threshold between the first and second thresholds to divide the intermediate illuminance range into a first intermediate illuminance range that is above the third threshold and a second intermediate illuminance range that is below the third threshold;
the controller moves the sun visor body after the target position is continuously set closer to the retracted position than the position of the sun visor body for a predetermined time and the target position is set closer to the retracted position than the present position when the incident intensity is in the first intermediate illuminance range;
the controller immediately moves the sun visor body when the target position is set closer to the projected position than the position of the sun visor body when the incident intensity is in the first intermediate illuminance range; and
the controller moves the sun visor body after the target position is continuously set closer to the retracted position or the projected position than the position of the sun visor body for a predetermined time when the incident intensity is in the second intermediate illuminance range.

3. The automatic sun visor device according to claim 1, wherein the controller determines the target position based on a minimum value of the incident angle of the incident light detected during a period when the sun visor body is being held at a present position, when the incident intensity is in the intermediate illuminance range.

4. The automatic sun visor device according to claim 1, further comprising:
a vehicle velocity detector for detecting vehicle velocity;
wherein the controller sets the predetermined time in accordance with the vehicle velocity.

5. The automatic sun visor device according to claim 1, further comprising:
a storing device for storing the incident intensity and the incident angle;

a deviation calculator for calculating deviation of the incident intensity and deviation of the incident angle based on the incident intensity and the incident angle stored in the storing device
an estimated incident angle calculator for calculating an estimated incident angle based on the deviation of at least one of the incident intensity and the incident angle,
wherein the controller moves the sun visor body based on the estimated incident angle.

6. The automatic sun visor device according to claim 5, wherein the deviation calculator obtains a standard deviation of plural pieces of data indicating the incident intensity and obtains a standard deviation of plural pieces of data indicating the incident angle.

7. The automatic sun visor device according to claim 5, further comprising:
a candidate value calculator for calculating an estimated incident intensity candidate and an estimated incident angle candidate based on the incident intensity and the incident angle stored in the storing device, and storing the estimated incident intensity candidate and the estimated incident angle candidate in the storing device; and
a determining device for determining whether a latest one of the incident intensity or the incident angle is temporarily changing based on the deviation obtained by the deviation calculator;
wherein when the determining device determines that the incident intensity or the incident angle is changing temporarily, the estimated incident angle calculator sets the incident angle or the estimated incident angle candidate stored in the storing device prior to the change as the estimated incident angle.

8. The automatic sun visor device according to claim 7, wherein the candidate value calculator calculates an average of plural pieces of data indicating the incident intensity as the estimated incident intensity candidate and calculates an average of plural pieces of data indicating the incident angle as the estimated incident angle candidate.

9. The automatic sun visor device according to claim 7, wherein the estimated incident angle calculator sets a latest one of the estimated incident angle candidate stored in the storing device as the estimated incident angle when the determining device determines that the incident intensity and the incident angle are not temporarily changing.

10. The automatic sun visor device according to claim 5, wherein the controller moves the sun visor body based on the estimated incident angle calculated by the estimated incident angle calculator when the incident intensity is greater than or equal to a preset high illuminance threshold and less than or equal to a preset incident intensity threshold, while the deviation of the incident angle is less than or equal to a preset incident angle threshold.

11. The automatic sun visor device according to claim 10, wherein the controller moves the sun visor body toward the retracted position when the incident intensity is less than a preset low illuminance threshold and the deviation of the incident intensity is less than or equal to the incident intensity threshold.

12. The automatic sun visor device according to claim 5, wherein the controller moves the sun visor body toward the retracted position after holding the sun visor body at the present position for a predetermined time in at least one of cases in which the incident intensity is a value between a preset low illuminance threshold and a preset high illuminance threshold, the deviation of the incident intensity is greater than a preset incident intensity threshold, and the deviation of the incident angle is greater than a preset incident angle threshold.

13. The automatic sun visor device according to claim 5, further comprising:
   a vehicle velocity detector for detecting vehicle velocity; and
   a interval changing controller for changing a control interval for controlling movement of the sun visor body in accordance with the vehicle velocity.

14. The automatic sun visor device according to claim 13, wherein the interval changing controller sets the control interval to be shorter as the vehicle velocity increases.

15. The automatic sun visor device according to claim 13, wherein the interval changing controller changes the number of times the incident intensity and the incident angle are calculated per unit time.

16. The automatic sun visor device according to claim 6, further comprising:
   a vehicle velocity detector for detecting vehicle velocity; and
   a changing device for changing the amount of data in accordance with the vehicle velocity.

17. The automatic sun visor device according to claim 16, wherein the changing device increases the amount of data as the vehicle velocity increases.

* * * * *